United States Patent [19]
Ichikawa

[11] Patent Number: 5,757,535
[45] Date of Patent: May 26, 1998

[54] OPTICAL SCANNER

[75] Inventor: Junichi Ichikawa, Ebina, Japan

[73] Assignee: Fuji Xerox Co., Ltd., Tokyo, Japan

[21] Appl. No.: 851,498

[22] Filed: May 5, 1997

[30] Foreign Application Priority Data

May 10, 1996 [JP] Japan ................... 8-116750

[51] Int. Cl.$^6$ .................................................. G02B 26/08
[52] U.S. Cl. .......................... 359/216; 359/204; 359/217; 359/218; 359/219
[58] Field of Search .................... 359/204–212, 359/216–219, 708; 347/258–261; 250/234–236

[56] References Cited

U.S. PATENT DOCUMENTS

| | | |
|---|---|---|
| 4,941,721 | 7/1990 | Banton et al. . |
| 5,278,691 | 1/1994 | Kessler ................... 359/216 |
| 5,315,427 | 5/1994 | Rauch et al. . |
| 5,367,400 | 11/1994 | Harris et al. ............... 359/216 |
| 5,479,583 | 12/1995 | Harris ...................... 359/216 |

FOREIGN PATENT DOCUMENTS

| | | |
|---|---|---|
| 3-80214 | 4/1991 | Japan . |
| 6-18803 | 1/1994 | Japan . |
| 6-59209 | 3/1994 | Japan . |
| 6-214184 | 8/1994 | Japan . |

*Primary Examiner*—James Phan
*Attorney, Agent, or Firm*—Oliff & Berridge, PLC

[57] ABSTRACT

An optical scanner in which light beams from a light source are made incident in such a manner as to extend over a plurality of reflecting surfaces of a rotating polygon mirror, comprising: a light source; a first optical system which causes at least divergent light beams of a main scanning direction from the light source to be made into substantially parallel light beams; a rotating polygon mirror which deflects the substantially parallel light beams emitted from the first optical system along a predetermined main scanning direction by the plurality of reflecting surfaces; and a second optical system which causes the light beams deflected by the rotating polygon mirror to be scanned on a surface to be scanned substantially at a uniform velocity and to be converged on the surface to be scanned, wherein the substantially parallel light beams emitted from the first optical system is provided to form a wave surface for correcting an aberration in the second optical system. Accordingly, the wave surface of light beams incident on the rotating polygon mirror is formed so as to correspond to a deflection angle by the first optical system and the aberration in the second optical system is thereby corrected.

32 Claims, 22 Drawing Sheets

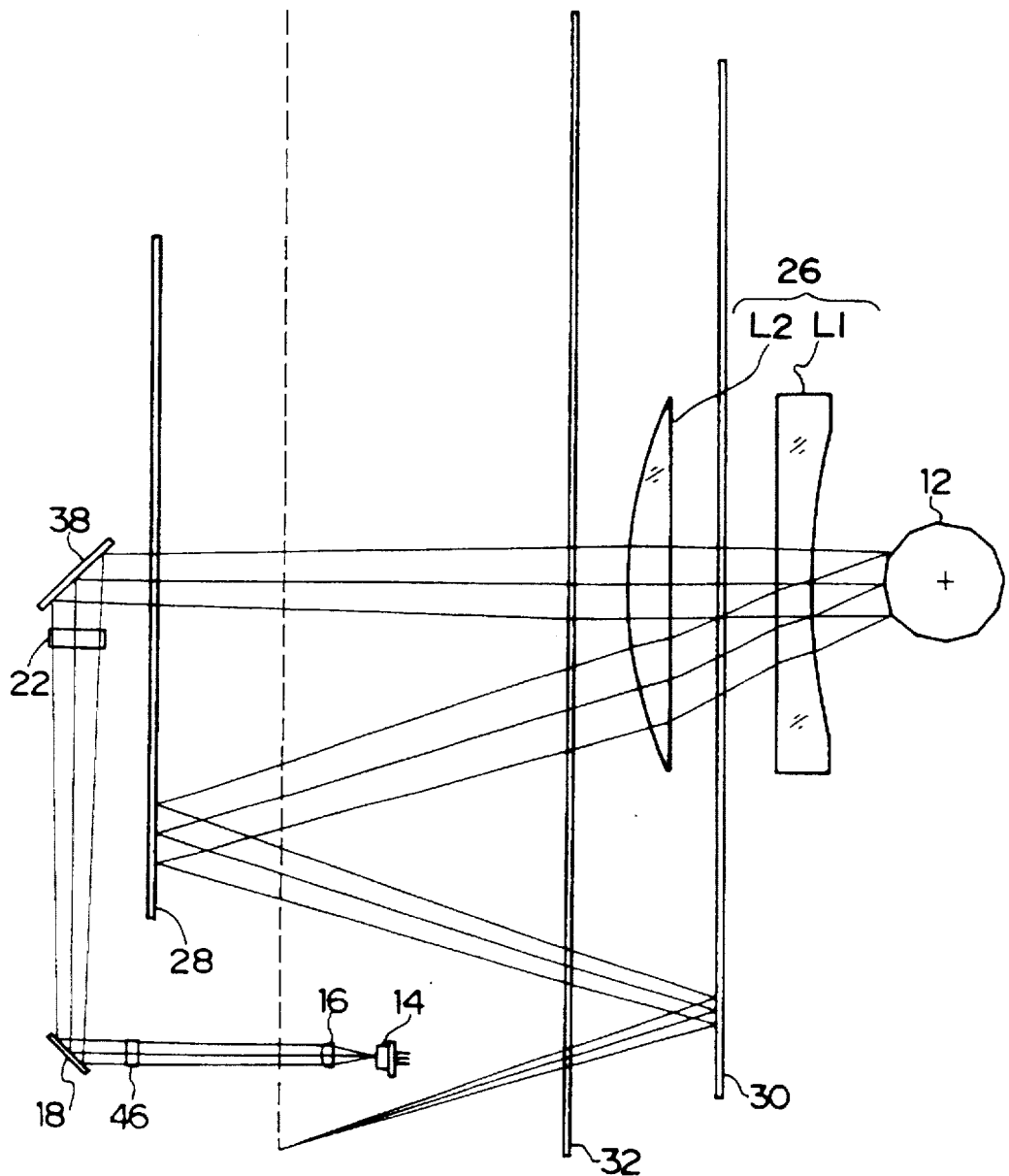
F I G. 4

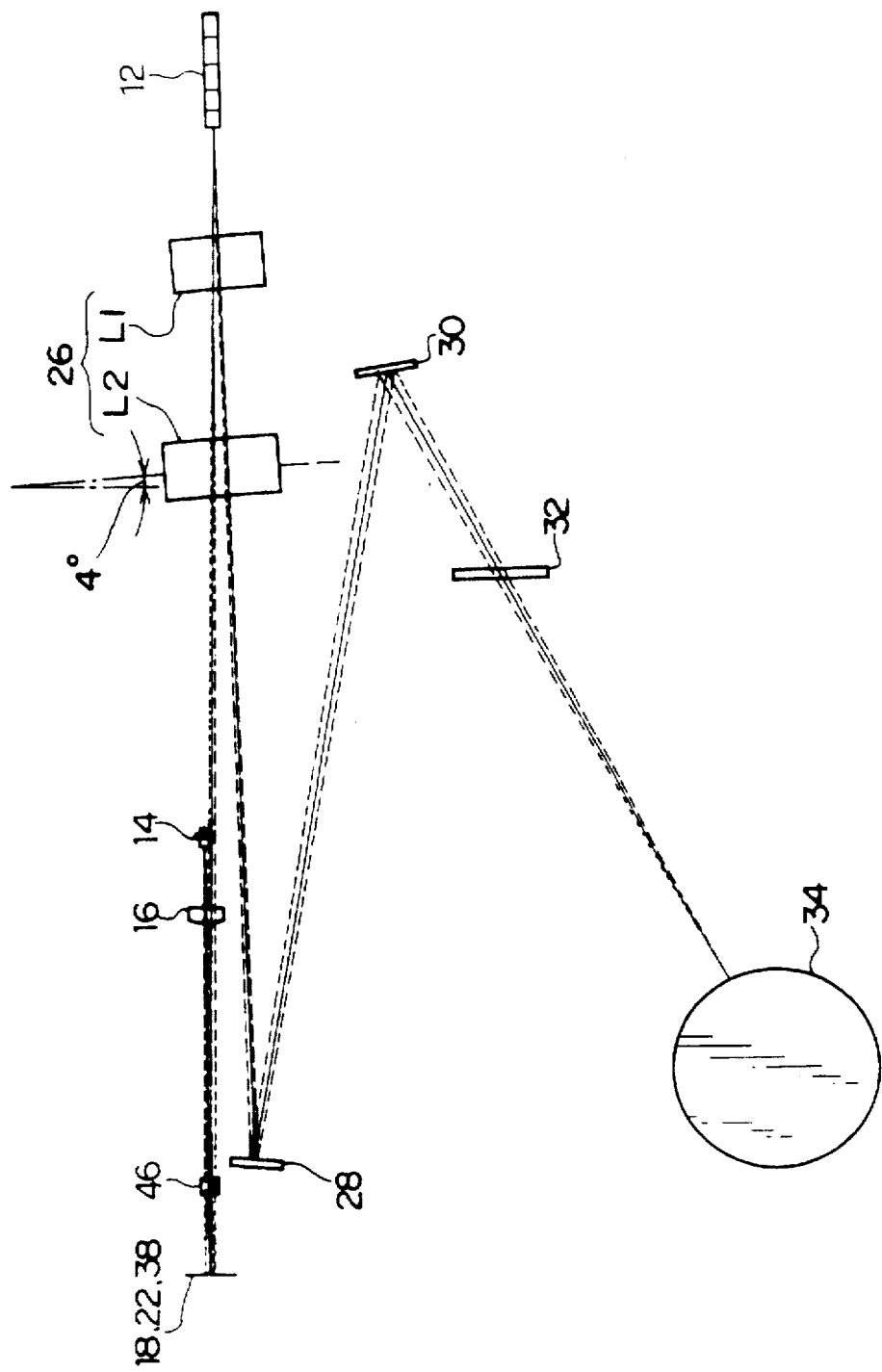
F I G. 5

OPTICAL SCANNER

BACKGROUND OF THE INVENTION

1. Field of the Invention

The present invention relates to an optical scanner, and particularly to an optical scanner of an overfilled type which comprises a light source, a first optical system which causes divergent light beams from the light source to be made into substantially parallel light beams, a rotating polygon mirror having a plurality of reflecting surfaces parallel to the axis of rotation of the polygon mirror and rotating around the axis of rotation substantially at an equiangular velocity to deflect incident light beams by the reflecting surfaces along a predetermined main (or fast) scanning direction, and a second optical system for converging the light beams deflected by the rotating polygon mirror on a surface to be scanned so that the surface to be scanned is scanned by the deflected light beams along the main scanning direction substantially at a uniform velocity, in which the light beams from the light source are made incident on the rotating polygon mirror in such a manner as to extend over the plurality of reflecting surfaces, and to an optical lens which is provided in the optical scanner and which causes the light beams from the light source to be made into substantially parallel light beams and causes the substantially parallel light beams to be made incident on the rotating polygon mirror such that the light beams extend over the reflecting surfaces of the polygon mirror.

2. Description of the Related Art

As an optical system which has conventionally been applied to an optical scanner of a laser printer or a digital copying machine, there have existed optical systems of an underfilled type and an overfilled type.

The underfilled-type optical system is constructed such that, as described in Japanese Patent Application Laid-Open (JP-A) No. 6-18803, a width of light beams incident on a rotating polygon mirror along a direction corresponding to the main scanning direction is made smaller than the width of each reflecting surface (hereinafter referred to as surface width) of the rotating polygon mirror along a direction in which the polygon mirror rotates. For example, in an optical scanner 70V shown in FIG. 13, light beams emitted from a light source 71V are made into substantially parallel light beams (in which a wave surface is a plane) by a collimator lens 72V and are made incident on a rotating polygon mirror 78V. The light beams deflected by the rotating polygon mirror 78V are converged by an fθ lens 76V on a surface 82V to be scanned so that the surface 82V to be scanned is scanned substantially at a uniform velocity. As described above, the underfilled-type optical system is characterized by that the width of light beams incident on the rotating polygon mirror 78V is made smaller than the surface width of the rotating polygon mirror 78V.

When the case of a subscanning direction of the optical scanner 70V such as the above is considered, the light beams made into substantially parallel light beams by the collimator lens 72V are temporarily converged on the rotating polygon mirror 78V by a cylindrical lens 74V (not shown). As shown in FIG. 14, light beams deflected by the rotating polygon mirror 78V are converged again on the surface 82V to be scanned by the fθ lens 76V and a cylindrical mirror 81. The reflecting surface of the rotating polygon mirror 78V and the surface 82V to be scanned have an optically conjugate relationship provided by the fθ lens 76V and the cylindrical mirror 81 so as to prevent a change of the scan position in the subscanning direction (i.e., nonuniformity of pitches) which is caused by surface tilting of the rotating polygon mirror 78V. Meanwhile, the present invention is directed toward the main scanning direction and a description of the sub scanning direction is omitted, but the underfilled optical system can be applied to the present invention irrespective of correction of surface tilting of the rotating polygon mirror.

On the other hand, an optical system of an overfilled type is, as described in Japanese Patent Application Laid-Open (JP-A) No. 6-59209, constructed such that the width of light beams incident on a rotating polygon mirror along a direction corresponding to the main scanning direction is made larger than the surface width of the rotating polygon mirror. For example, as shown in FIG. 15, light beams emitted from a light source 71W are made into substantially parallel light beams having a width $D_0$ via lenses 75, 72W and are made incident on a rotating polygon mirror 78W. The overfilled optical system is characterized by that the width $D_0$ is larger than a surface width $D_1$ of the rotating polygon mirror 78W.

In the overfilled optical system like the above, the surface width of the rotating polygon mirror can be made smaller and the number of surfaces thereof can be made larger as compared to the underfilled optical system. For this reason, a high-speed scanning operation and high resolution in the optical scanner using a rotating polygon mirror having a low number of rotations can be achieved and the load of a motor for driving to rotate the rotating polygon mirror in the overfilled optical system can be kept lower than that in the underfilled optical system.

On the other hand, in the underfilled optical system, since the light beams incident on the rotating polygon mirror are all reflected, a beam profile of the light beams incident on the fθ lens is symmetrical about the center of light beams and the same beam profile is obtained irrespective of a deflection angle determined by the rotating polygon mirror. Further, in the overfilled optical system, as shown in FIG. 16, beam profiles of the light beams reflected by the rotating polygon mirror, namely, the beam profile of the light beams made incident on the fθ lens, each change due to the deflection angle and the beam profiles are each not symmetrical about the center of the light beams excepting at any one deflection angle.

Next, the difference of the beam profile in the main scanning direction on the surface to be scanned between the underfilled optical system and the overfilled optical system will be described. FIG. 17 shows a schematic structure of an underfilled optical scanner 70. Light beams from the light source 71 are made into substantially parallel light beams, in which a wave surface is substantially a plane, by a collimator lens 72 and are made incident on a rotating polygon mirror 78. Light beams deflected by the rotating polygon mirror 78 are converged in such a manner as to be moved by an fθ lens 76 formed by lenses L1 and L2 on the surface 82 to be scanned substantially at a uniform velocity.

With the above-described structure, an optical system with the light beams from the light source 71 being made incident on the rotating polygon mirror 78 from substantially the center of the deflection angle determined by the rotating polygon mirror 78 (namely, a so-called front incidence optical system) is used.

Meanwhile, so long as a beam splitter 90 described in Japanese Patent Application Laid-Open (JP-A) No. 6-59209 and also shown in FIG. 22 is disposed between the rotating polygon mirror 78 and the fθ lens 76 in FIG. 17, even when an angle between the light beams incident on the rotating polygon mirror 78 and the light beams emitted from the rotating polygon mirror 78 are made smaller, mounting of the above-described structure is allowed.

The structure of the above-described optical system in the main scanning direction is described below.

Width of light beams incident on the rotating polygon mirror: 8 mm

Intensity distribution of the light beams with respect to the above-described width of light beams: Gaussian distribution of which the half width is 1.22939 times the width of light beams incident on the rotating polygon mirror Inscribed circle radius of the rotating polygon mirror: 14 mm Distance between the rotating polygon mirror and fθ lens L1: 21.5 mm fθ lens L1

Radius of curvature at the side of the rotating polygon mirror: −170.43 mm

Radius of curvature at the side of the surface to be scanned: ∞ mm

Central thickness: 6 mm

Refractive index: 1.609110

Distance between fθ lens L1 and fθ lens L2: 27.86246 mm fθ lens L2

Radius of curvature at the side of the rotating polygon mirror: ∞ mm

Radius of curvature on the side of the surface to be scanned: 122.67 mm

Central thickness: 10 mm

Refractive index: 1.712268

Distance between fθ lens L2 and the surface to be scanned: 374.272141 mm

Deflection angle of the rotating polygon mirror (the fθ optical axis is set to be 0°): ±12.8°

FIG. 18 shows a beam profile at a scan end on the surface to be scanned in the main scanning direction with the underfilled optical system being used. As clearly seen from FIG. 18, rising portions (which are each hereinafter referred to as a "side lobe") each having an intensity of 3% or thereabouts are indicated at both sides of beams of about 50 μm (having a width of intensity $1/e^2$) substantially in a symmetrical manner.

FIG. 19 shows a structural example of the optical scanner 70S in which the above-described fθ lens is applied to the overfilled optical system. The differences between this overfilled optical system and the underfilled optical system shown in FIG. 17 are described below.

Width of the light beams incident on the rotating polygon mirror: 20 mm

Surface width of the rotating polygon mirror: 7.5 mm

Intensity distribution of light beams with respect to the above-described light beam width: Gaussian distribution of which half width is 0.51764 times the width of light beams incident on the rotating polygon mirror FIG. 20 shows a beam profile at a scan end on the surface to be scanned in the main scanning direction with the above-described overfilled optical system used. As clearly seen from FIG. 20, this beam profile is different from that obtained by the underfilled optical system shown in FIG. 18 and side lobes are formed on both sides about the center of the profile in an asymmetrical manner, a larger side lobe having an intensity of about 6% which is twice the intensity of the underfilled optical system.

When the side lobe is large, for example, the signal-to-noise ratio (S/N) of an exposure energy distribution written on the surface to be exposed (the surface to be scanned) by an exposure apparatus including the optical scanner deteriorates as shown in FIG. 21. The x axis of the graph shown in FIG. 21 indicates a position in the main scanning direction and the y axis of the graph indicates exposure energy. This graph indicates an exposure energy distribution when the ratio of the time light is on and the time light is off is set to be 1:1. The curve E1 indicated by the solid line shows that no side lobe exists and the curve E2 indicated by the dotted line shows that the side lobe is large.

There exists a problem in that adverse effects such as the lowering of resolution, thickening of a thin line, and the like are exerted on an image written on the surface to be scanned due to deterioration of the S/N ratio. Further, the side lobe becomes larger as the beam diameter is made smaller. For this reason, in a case in which a beam spot diameter on the surface to be scanned is decreased in order to correspond to high image quality, the above-described problem becomes particularly serious.

Accordingly, there has been conventionally proposed a technique in which the side lobe is reduced in such a manner that an fθ lens is formed by increasing the number of lenses or by using glass materials having a high refractive index so as to improve image-forming properties.

However, the fθ lens becomes expensive and complication of the structure of the optical system cannot be avoided. Namely, it is necessary to assemble a plurality of expensive lenses using highly accurate assembly, thereby resulting in difficulties in practicability.

SUMMARY OF THE INVENTION

The present invention has been achieved in order to solve the above-described drawbacks and an object thereof is to provide an optical scanner in which an overfilled optical system can be realized by using a simple structure and an increase of a side lobe can be prevented.

In order to achieve the above-described object, in accordance with a first aspect of the present invention, there is provided an optical scanner in which light beams from a light source are made incident in such a manner as to extend over a plurality of reflecting surfaces of a rotating polygon mirror, comprising: a light source; a first optical system which causes at least divergent light beams of a main scanning direction from the light source to be made into substantially parallel light beams; a rotating polygon mirror which deflects the substantially parallel light beams emitted from the first optical system along a predetermined main scanning direction by the plurality of reflecting surfaces; and a second optical system which causes the light beams deflected by said rotating polygon mirror to be scanned on a surface to be scanned substantially at a uniform velocity and to be converged on the surface to be scanned, wherein the substantially parallel light beams emitted from the first optical system is provided to form a wave surface for correcting an aberration in the second optical system.

In the first aspect of the present invention, as shown in FIG. 16, by taking advantage of a state in which a portion of light beams incident on the rotating polygon mirror, which is deflected by one reflecting surface of the rotating polygon mirror and converged on the surface to be scanned, changes in accordance with the deflection angle and by causing the wave surface of light beams incident on the rotating polygon mirror, which the wave surface being made substantially plane in a conventional collimator lens, to be formed so as to correspond to each deflection angle by using the first optical system, the wave surface for correcting the aberration in the second optical system is formed in the light beams emitted from the first optical system. As a result, it is possible to correct the aberration in the second optical system.

Practically, the aberration in the second optical system has the property of increasing as the deflected light beams are moved from the scan central portion to the scan end portion. Due to the aberration, the intensity distribution of the light beams converged on the surface to be scanned is deviated from the shape of the Gaussian distribution and the above-described side lobes are thereby formed.

Accordingly, in accordance with a second aspect of the present invention, in the first aspect the first optical system is formed to emit light beams having a wave surface for correcting deformation of intensity distribution of the light beams which are converged on the surface to be scanned, which the deformation becoming larger as the deflected light beams are moved from a scan central portion to a scan end portion.

In the second aspect of the present invention, as the wave surface for correcting deformation (side lobes) of the intensity distribution of the convergent light beams which increase as the deflected light beams are moved from the scan central portion to the scan end portion, a wave surface is formed which is deviated from the plane as it is moved apart from the optical axis of the first optical system. As a result, the side lobes can be reduced. Namely, it is possible to realize an overfilled optical system having a comparatively simple structure and also to prevent the increase of side lobes.

The wave surface used to reduce side lobes can be obtained by the first optical system including at least one aspherical optical component, which is a third aspect of the present invention.

More specifically, in a conventional optical system with one aspherical collimator lens used, as a fourth aspect of the present invention, when the aspherical collimator lens is replaced by an aspherical lens provided to form a wave surface which is deviated from the plane as it is moved apart from the optical axis of the first optical system, side lobes can be reduced without causing an increase in the number of lenses. Further, in an optical system with a plurality of collimator lenses used, as a fifth aspect of the present invention, it suffices that at least one lens among the plurality of lenses is formed as an aspherical lens provided to have a wave surface deviated from the plane as it is moved apart from the optical axis of the first optical system.

In the structure with at least one optical component in the first optical system is formed as an aspherical member as described above, as a sixth aspect of the present invention, the first optical system is formed by a front incidence optical system in which light beams from the light source are made incident on the rotating polygon mirror substantially from the center of a deflection angle of the rotating polygon mirror. As a result, it becomes possible that the rotating polygon mirror may be made smaller, which has conventionally been regarded as a merit of the front incidence optical system and manufacturing of the optical system is facilitated.

Namely, the aspherical shape of the above-described aspherical optical component can be made symmetrical about the optical axis in the main scanning direction. Further, the aspherical shape of the above-described aspherical optical component can be formed to be rotationally symmetrical about the optical axis, and therefore, manufacturing of lenses by glass molding is facilitated.

Further, in a case in which the first optical system is formed by the front incidence optical system as described above, as a seventh aspect of the present invention, the first optical system is formed so that light beams from the light surface are made incident on the rotating polygon mirror from a direction provided at an angle with respect to a direction orthogonal to the axis of rotation within a plane on which an optical axis of the light beams and the axis of rotation of the rotating polygon mirror are included. As a result, the front incidence optical system can be provided at a low number of components without causing an increase in the number of an optical component such as the beam splitter 90 shown in FIG. 22.

Moreover, as an eighth aspect of the present invention, the first optical system is formed by a double-path optical system in which light beams from the light source are transmitted through an identical optical component included in the first optical system before light beams are made incident on the rotating polygon mirror and after light beams are deflected by the rotating polygon mirror. As a result, an angle of incidence in the subscanning direction can be sufficiently made smaller and a degree of freedom of design can be increased accordingly.

On the other hand, when formation of the front incidence optical system is difficult from the standpoint of layout or deflection of scan lines cannot be allowed which is caused by front incidence of light beams provided at an angle with respect to the subscanning direction, the first optical system may also be provided so that light beams from the light source are made incident on the rotating polygon mirror further from an exterior side than the maximum deflection angle of the rotating polygon mirror.

In this case, there is no possibility that a deflected portion of light beams incident on the rotating polygon mirror may change to be symmetrical in accordance with the deflection angle. For this reason, so long as the cross-sectional configuration of the aspherical optical component along the main scanning direction is formed to be aspherical as occasion demands, the effect in that the side lobes are reduced can be obtained.

In addition, in accordance with still another aspect of the present invention, there is provided an optical lens which is used by a first optical system of an optical scanner, the optical scanner being provided in that at least divergent light beams of a main scanning direction from a light source are emitted as substantially parallel light beams by a first optical system, the emitted light beams are made incident on at least two reflecting surfaces of a rotating polygon mirror having a plurality of reflecting surfaces parallel to an axis of rotation, the incident light beams are deflected along a predetermined main scanning direction, and the deflected light beams are converged on a surface to be scanned by a second optical system and also are used for scanning along the main scanning direction, the optical lens being provided to emit the substantially parallel light beams so that light beams deflected by any one reflecting surface among the at least two reflecting surfaces have a wave surface for correcting an aberration in the second optical system.

BRIEF DESCRIPTION OF THE DRAWINGS

FIG. 4 is a plan view showing the structure of the optical scanner according to the second embodiment.

FIG. 5 is a side view showing the structure of the optical scanner according to the second embodiment.

DESCRIPTION OF THE PREFERRED EMBODIMENTS

A description will be given hereinafter of embodiments according to the present invention. Note that the expression which shows an aspheric surface shape in each embodiment is given as described below.

$$Z=(1/r)h^2/(1+(1-(1+k)(1/r)^2h^2)^{1/2})+Ah^4+Bh^6+Ch^8+Dh^{10} \quad (1)$$

This expression shows a rotationally-symmetrical and aspheric surface shape around an optical axis. Z means a sag at height "h" from the optical axis.

[First Embodiment]

First, an optical scanner according to a first embodiment of the present invention will be described. The optical scanner in the first embodiment has substantially the same structure as that of the overfilled optical scanner 70S shown in FIG. 19 with the exception of the shape of a collimator lens serving as a first optical system, which will be described later.

A difference between a collimator lens in a conventional overfilled optical scanner and a lens in the optical scanner of the first embodiment will be described. The conventional collimator lens has, for example, the following structural dimensions:

Effective diameter: 20 mm
Shape at a side where a laser beam is incident: planar
Central thickness: 4 mm
Refractive index: 1.582525
Shape at a side where the laser beam is emitted:
r=−29.12027
k=−0.250938
A=0.173048e$^{-5}$
B=0.139862e$^{-8}$
C=0.920118e$^{-12}$
D=0.710148e$^{-15}$ On the other hand, the shape of the lens of the first embodiment is different from the above-described collimator lens in the following respects, but these lenses have the same structure in other respects:

K=−0.275426
A=0.151404e$^{-5}$
B=0.115267e$^{-7}$
C=−0.151367e$^{-9}$
D=0.703704e$^{-12}$

Figure 1:
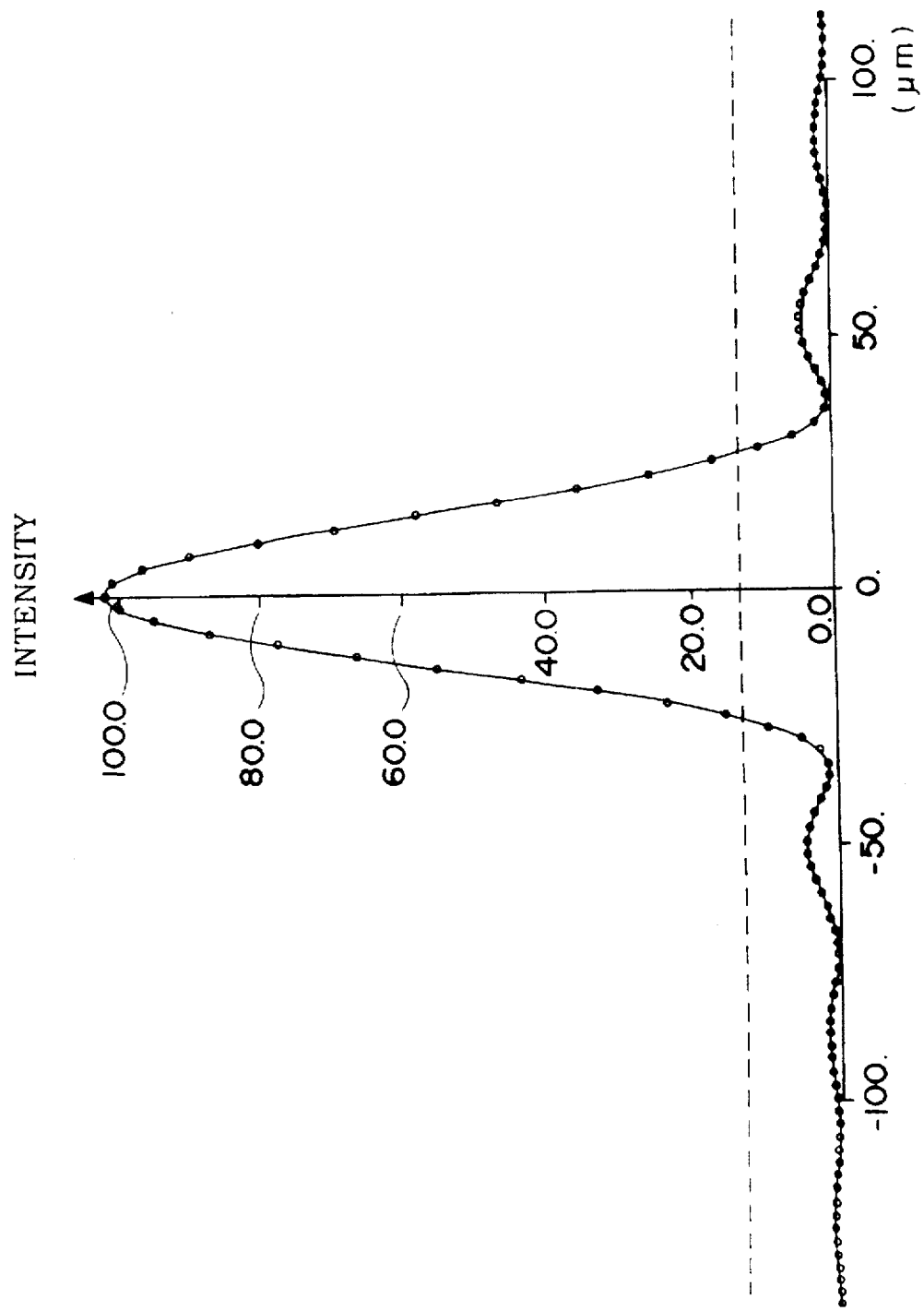
FIG. 1 shows a laser beam profile of a main scanning direction at a scan end on a surface to be scanned in a first embodiment of the present invention.
Figure 20:
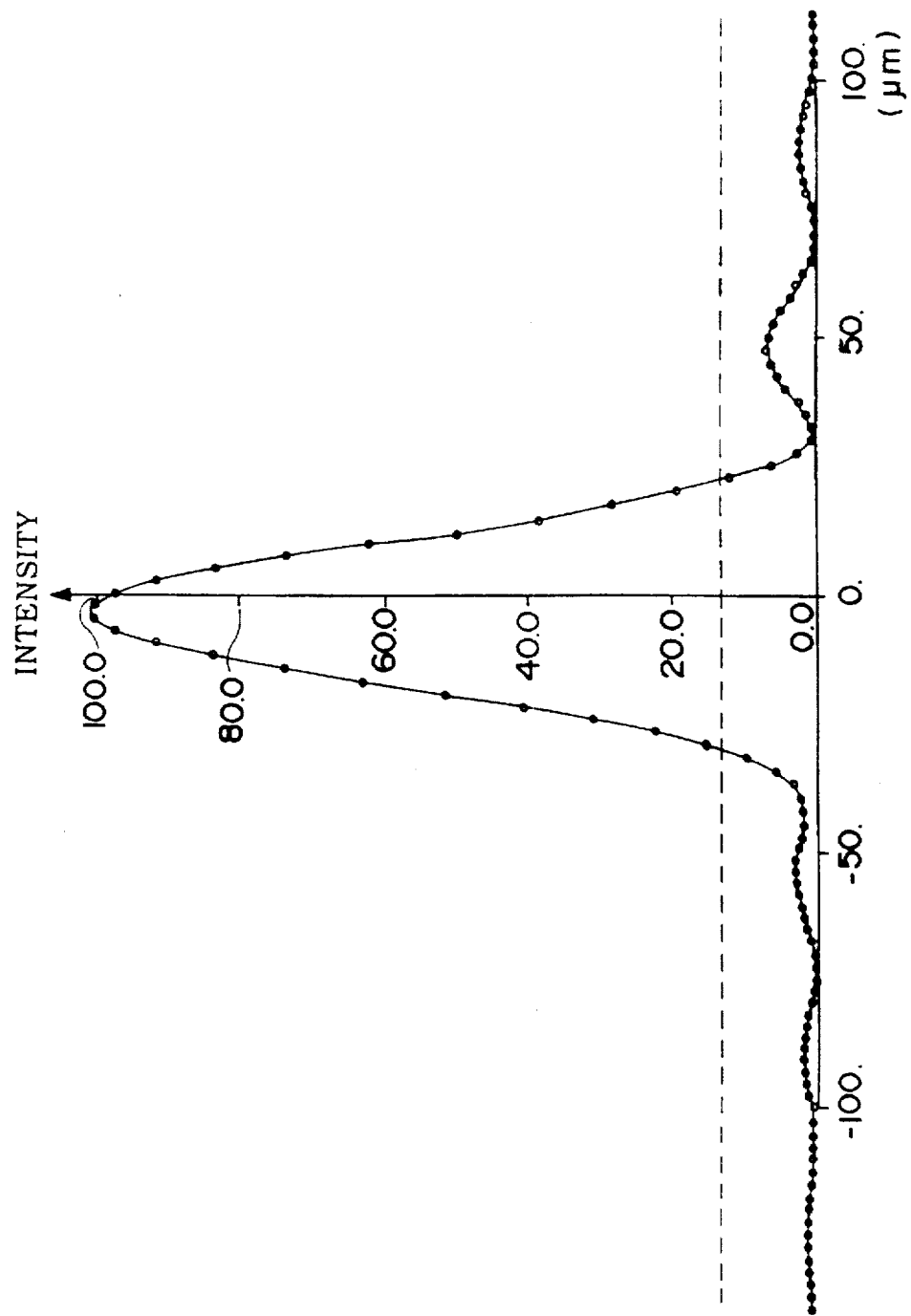
FIG. 20 shows a laser beam profile of a main scanning direction at a scan end on the surface to be scanned with the overfilled optical system shown in FIG. 19 being used.
Figure 21:
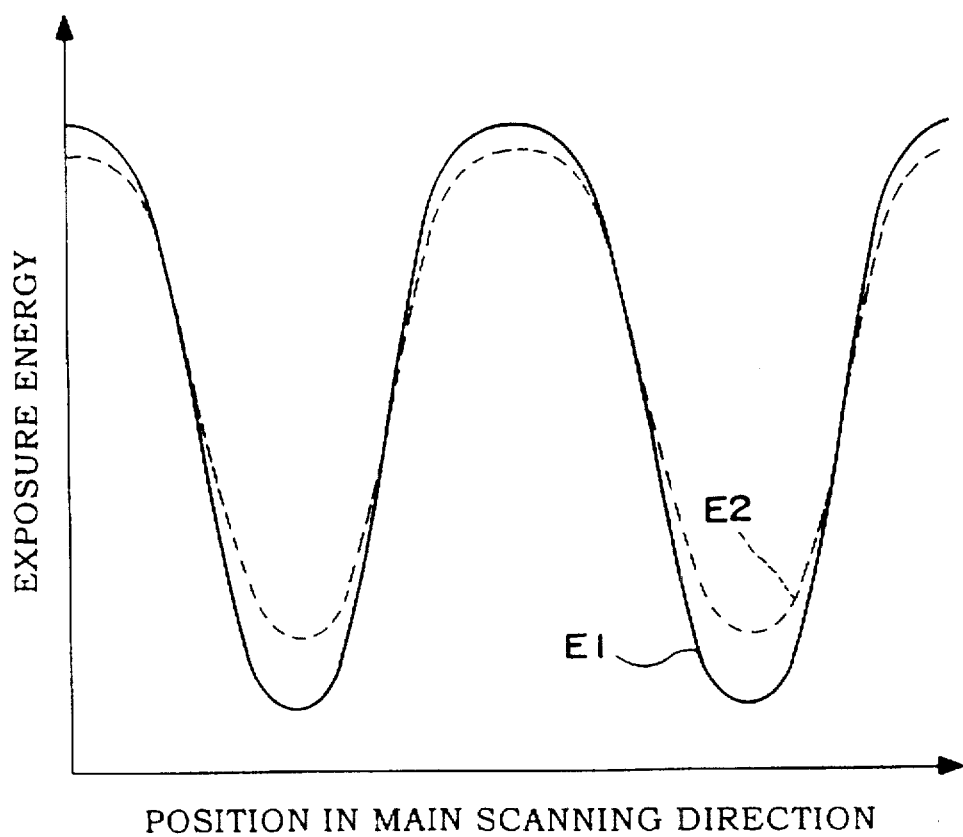
FIG. 21 shows that an S/N ratio of exposure energy distribution deteriorates due to side lobes.
Figure 22:
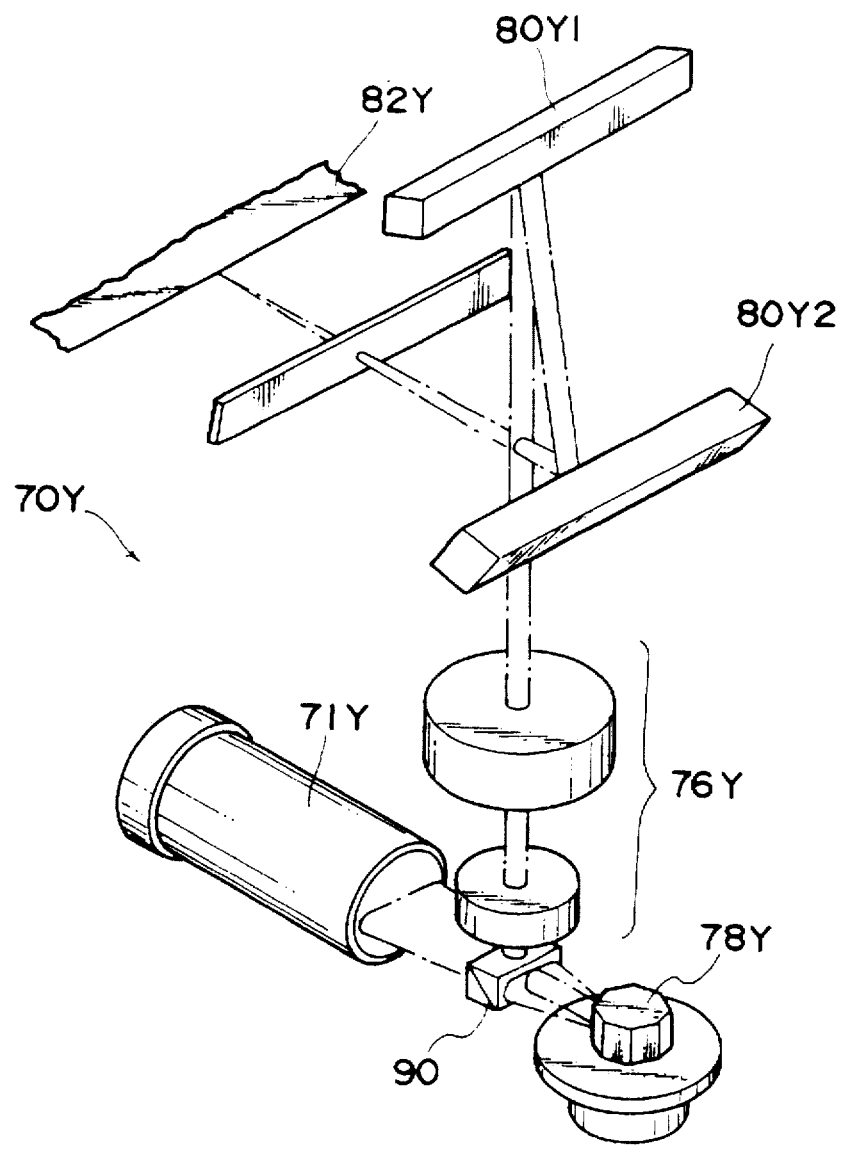
FIG. 22 shows a structural example of a front incidence optical system formed to have a beam splitter.

A beam profile at a scan end on a surface to be scanned when the lens of the first embodiment is used is shown in FIG. 1. As is clearly seen from FIG. 1, side lobes are formed in a symmetrical manner and as compared to the beam profile shown in FIG. 20, these side lobes are reduced.

Figure 2:
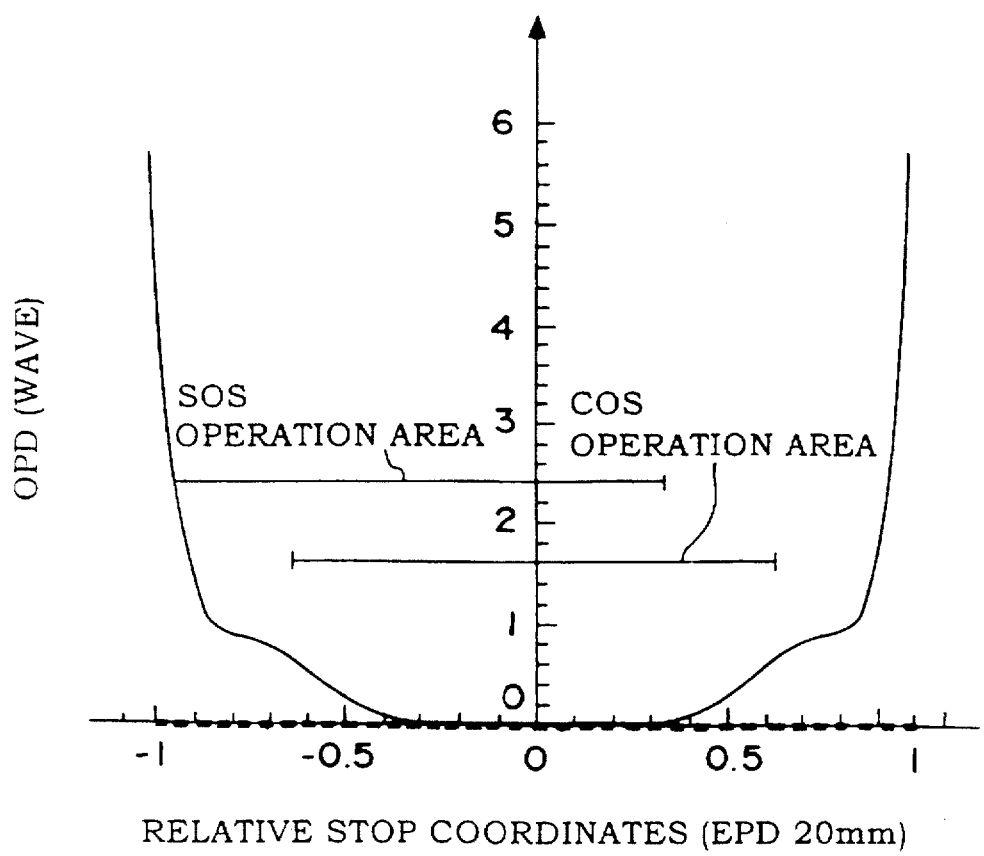
FIG. 2 shows a difference between a wave surface formed by a conventional collimator lens and a wave surface formed by an aspherical lens of the first embodiment.

Next, the difference of an output wave surface between the conventional collimator lens and the lens of the first embodiment is shown in FIG. 2. In the graph shown in FIG. 2, the x axis indicates a height from an optical axis and the y axis indicates an aberration (OPD) of a wave surface from the plane position. The solid line indicates an output wave surface in the lens of the first embodiment and the dotted line indicates an output wave surface in the conventional collimator lens.

As clearly seen from FIG. 2, the wave surface of the conventional collimator lens has an OPD of "0" (i.e., the wave surface is made overlapping the horizontal axis in FIG. 2) and it is planar, but the output wave surface of the lens of the first embodiment is deviated from a plane position as it is moved apart from the optical axis. More specifically, since the wave surface used when the center of scan (COS) on the surface to be scanned is illuminated is symmetrical about the optical axis and has small aberration from the plane, the difference of the shape of a wave surface between the lens of the first embodiment and the collimator lens when the center of scan is illuminated is small and the beam profile does not change accordingly. On the other hand, the output wave surface used when the scan end is illuminated is asymmetrical about the optical axis and a one-side wave surface is greatly deviated from the plane position.

The lens of the first embodiment is formed so that the output wave surface thereof is further deviated from the plane position as it is moved apart from the optical axis. Accordingly, with this lens being used, it is possible to form a wave surface which allows correction of aberration of an optical system such as an fθ lens, which corresponds to a second optical system of the present invention, and also possible to reduce side lobes.

[Second Embodiment]

Figure 3:
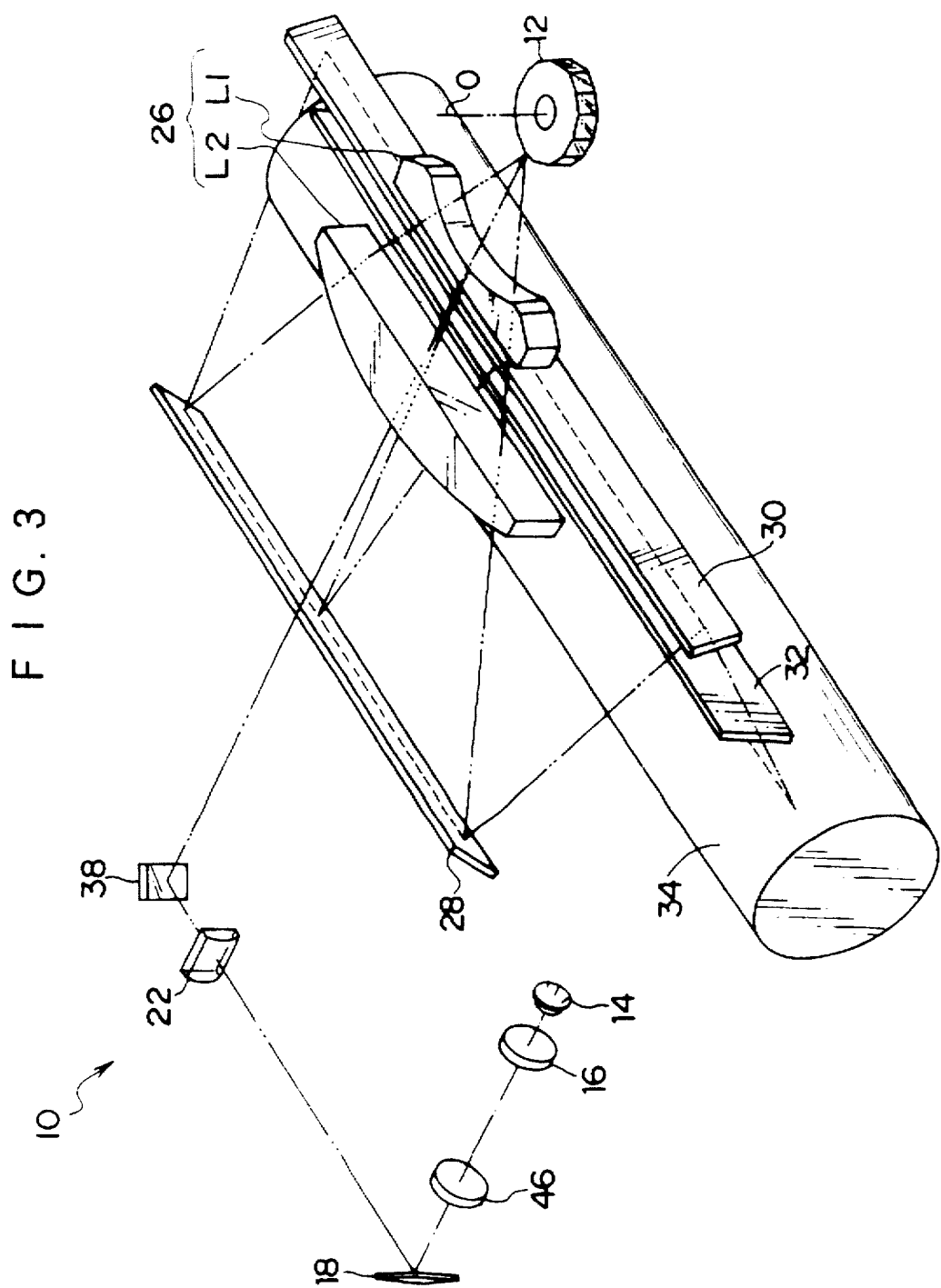
FIG. 3 is a perspective view showing a structure of an optical scanner according to a second embodiment of the present invention.

Next, an optical scanner according to a second embodiment of the present invention will be described. FIGS. 3 through 5 each show an optical scanner 10 according to the second embodiment. Meanwhile, the optical scanner 10 is applied to an unillustrated exposure apparatus and an image is exposed onto a photosensitive drum 34 in such a manner that the photosensitive drum 34 is scanned by light beams based on image data.

As illustrated in FIGS. 3 through 5, a rotating polygon mirror 12 is disposed at one end of an unillustrated equipment body of the optical scanner 10. The rotating polygon mirror 12 has a regular-polygon and prismatic configuration and a plurality of reflecting surfaces is formed on a side surface thereof. The rotating polygon mirror 12 is rotated by unillustrated driving means such as a motor around an axis of rotation O extending along the vertical direction and at a predetermined angular velocity. Accompanied with the rotation of the rotating polygon mirror 12, light beams incident on the reflecting surfaces of the rotating polygon mirror 12 are reflected by the reflecting surfaces and are deflected at an equiangular velocity. Note that a direction in which light beams are deflected by the rotating polygon mirror 12 is referred to as a main scanning direction and a direction orthogonal to the main scanning direction is referred to as a subscanning direction.

Further, a laser diode 14 (hereinafter referred to as "LD 14") serving as a light source of the present invention is disposed within the unillustrated equipment body and a collimator lens 16 is disposed at a side where light beams are emitted from the LD 14. The LD 14 is connected to an unillustrated driver and is controlled to be in an on or off state by the driver in accordance with an image signal. A spherical lens 46 having negative power is disposed at the side where light beams are emitted from the collimator lens 16. The light beams emitted from the LD 14 as divergent light beams are made into parallel light beams by the collimator lens 16, and thereafter, are made again into divergent light beams by the spherical lens 46 and are made incident on a first fold back mirror 18. The first fold back mirror 18 is formed in that a reflecting surface is inclined along a direction corresponding to the main scanning direction and along a direction corresponding to the subscanning direction such that the light beams emitted from the spherical lens 46 are reflected at an angle of 90° along the direction corresponding to the main scanning direction and at an angle of 1.2° along the direction corresponding to the subscanning direction.

A cylinder lens 22 having power only in the subscanning direction to form an optical system for correcting surface tilting of the rotating polygon mirror 12, and a second fold back mirror 38 are disposed between the first fold back mirror 18 and the rotating polygon mirror 12 sequentially in that order from a side of the first fold back mirror 18. Further, an fθ lens 26 is disposed between the second fold back mirror 38 and the rotating polygon mirror 12 and has functions of converging light beams on a circumferential surface of the photosensitive drum 34, which serves as a surface to be scanned, and allowing scanning of the circumferential surface of the photosensitive drum 34 substantially at a uniform velocity. Light beams transmitted through the cylinder lens 22 and reflected by the second fold back mirror 38 are, in the same way as in the case in which light beams are emitted from the first fold back mirror 18, made incident on the reflecting surfaces of the rotating polygon mirror 12 via the fθ lens 26 downward at an angle of 1.2° along the direction corresponding to the subscanning direction. The incident light beams are reflected and deflected by the reflecting surfaces of the rotating polygon mirror 12, and thereafter, are made incident again on the fθ lens 26 (a so-called double path).

A plane mirror 28 is disposed at the side where light beams are emitted from the fθ lens 26 and a cylinder mirror 30 having power only in the subscanning direction to effect surface-tilting correction of the rotating polygon mirror 12 is disposed at the side where light beams are emitted from the plane mirror 28. Further, an opening provided in the unillustrated equipment body and causing the light beams to pass therethrough is disposed at the side where the light beams are emitted from the cylinder mirror 30 and a window 32 is mounted at the opening so as to prevent intrusion of dust and the like into the equipment body. The light beams transmitted through the fθ lens 26 are reflected by the plane mirror 28 and the cylinder mirror 30, sequentially, and thereafter, the light beams are transmitted through the window 32 and emitted out of the equipment body.

Further, the photosensitive drum 34 is disposed on a lower side of the optical scanner 10 and the light beams transmitted through the window 32 are imaged as an optical spot on the circumferential surface of the photosensitive drum 34 (i.e., the surface to be scanned) by the action of the fθ lens 26 and are used to scan the circumferential surface of the photosensitive drum 34 at a constant velocity. The photosensitive drum 34 is rotated by driving force of an unillustrated motor being transmitted thereto. The rotation of the photosensitive drum 34 allows a subscanning operation and an image (latent image) is thereby formed on the circumferential surface of the photosensitive drum 34.

Further, the optical scanner 10 according to the second embodiment is constructed such that the spherical lens 46 and the fθ lens 26 each serve as a beam expander and the width of the light beams incident on the rotating polygon mirror 12 along the main scanning direction is made larger than the surface width of the reflecting surface of the rotating polygon mirror 12 (a so-called overfilled optical system).

The structure of the optical system will be hereinafter described in detail.

Spherical lens

Radius of curvature at the side where light beams are incident: −54.41 mm

Radius of curvature at the side where light beams are emitted: ∞ mm

Central thickness: 3 mm

Refractive index: 1.511183

Distance between the spherical lens and the cylinder lens: 117.5 mm

Cylinder lens

Radius of curvature at the side where light beams are incident: 55.26 mm

Radius of curvature at the side where light beams are emitted: ∞ mm

Central thickness: 5 mm

Refractive index: 1.511183

Distance between the cylinder lens and the rotating polygon mirror: 211.4 mm

Surface width of the rotating polygon mirror: 7.5 mm

Inscribed circle radius of the rotating polygon mirror: 14 mm

Distance between the rotating polygon mirror and fθ lens
L1: 18.5 mm
fθ lens L1 (main-scanning-direction cylinder lens)
 Radius of curvature at the side of the rotating polygon mirror: −170.43 mm
 Radius of curvature at the side of the surface to be scanned: ∞ mm
 Central thickness: 9 mm
 Refractive index: 1.609110
Distance between fθ lens L1 and fθ lens L2: 26 mm
fθ lens L2 (main-scanning-direction cylinder lens)
 Radius of curvature at the side of the rotating polygon mirror: ∞ mm
 Radius of curvature at the side of the surface to be scanned: 122.67 mm
 Central thickness: 10 mm
 Refractive index: 1.712268
Distance between fθ lens L2 and the cylinder mirror: 253.8 mm
Cylinder mirror
 Radius of curvature: −182.68 mm
 Angle of incidence/emission: 38°
Distance between the cylinder mirror and the window: 40.3 mm
Window
 Thickness: 1.35 mm
 Refractive index: 1.511183
 Angle of incidence: 28°
Distance between the cylinder mirror and the surface to be scanned: 122.3 mm
Deflection angle of the rotating polygon mirror (an fθ optical axis is set to be 0°): ±12.8°

In the second embodiment, as shown in FIG. 5, the fθ lens 26 is inclined downward at an angle of 4° along the subscanning direction. As a result, when the light beams directed toward the rotating polygon mirror 12 are made incident on the fθ lens 26, it is possible to prevent ghost light, which is generated by the reflection of a portion of the light beams, from reaching the photosensitive drum 34. Further, with the fθ lens 26 being inclined in the above-described manner, the uniformity of the beam diameter of the light beams imaged on the photosensitive drum 34 is improved.

Each shape of the conventional collimator lens and the aspherical lens 46 according to the present invention will be described below in the same way as in the first embodiment. First, as an example, the conventional collimator lens has the following structural dimensions:
 Shape at the side where the laser beam is incident: planar
 Central thickness: 2.8 mm
 Refractive index: 1.675004
 Shape at the side where the laser beam is emitted:
 r=−8.43476
 k=−0.201409
 A=0.844720e$^{-4}$
 B=0.870596e$^{-6}$
 C=0.708263e$^{-8}$
 D=0.628978e$^{-10}$
 Width of light beams emitted from the collimator lens: 5.4 mm
 Intensity distribution of light beams with respect to the above-described light beam width: Gaussian distribution of which half width is 1.19824 times the width of the light beams incident on the rotating polygon mirror.

On the other hand, in the aspherical lens 46, the shape at the side where the laser beam is emitted is provided as follows:

k=0.322199
A=0.464330e$^{-4}$
B=0.925330e$^{-4}$
C=−0.205321e$^{-4}$
D=0.166449e$^{-5}$

Figure 6:
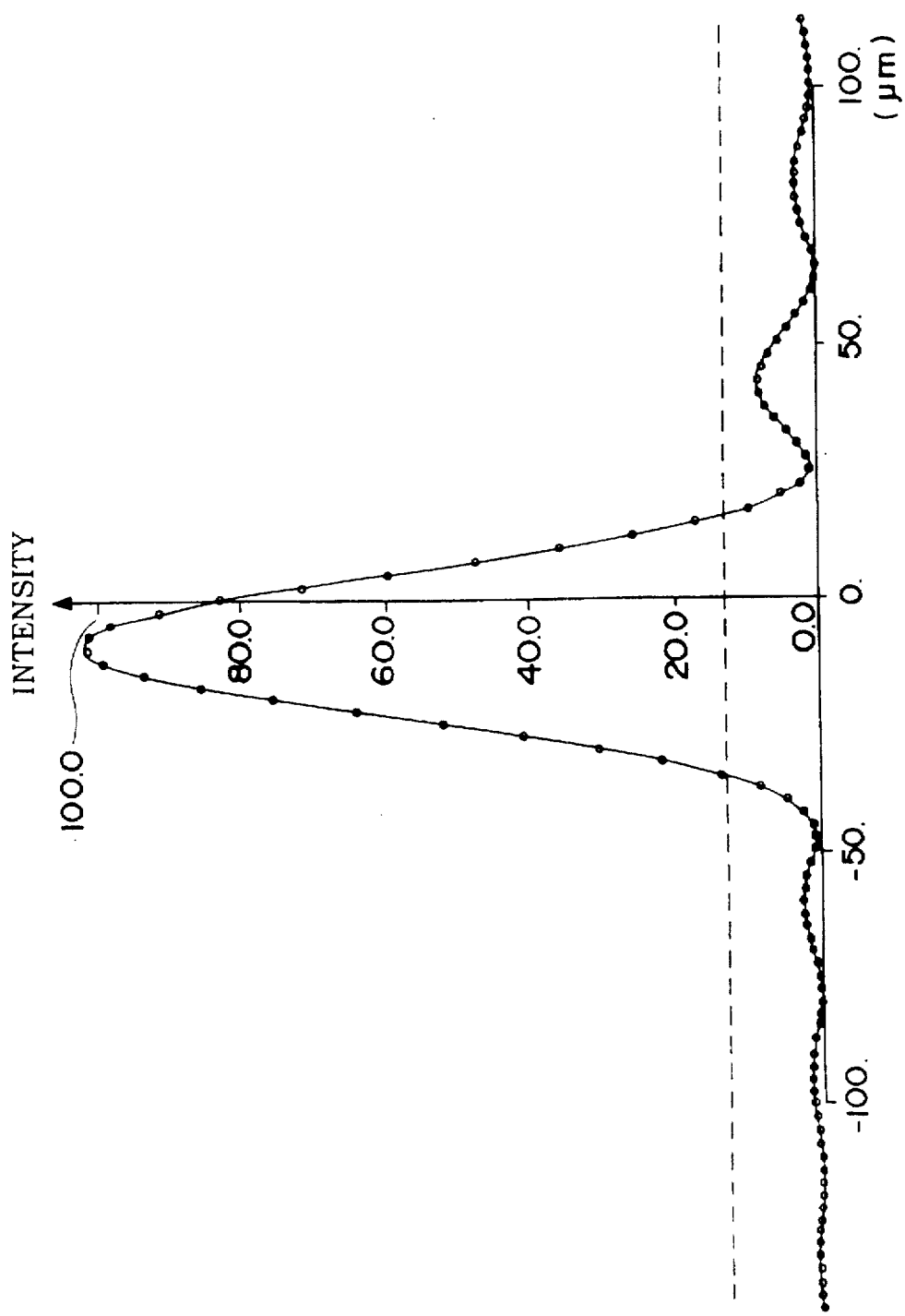
FIG. 6 shows a laser beam profile of a main scanning direction at a scan end on a surface to be scanned when a conventional collimator lens is applied to the optical scanner of the second embodiment.
Figure 7:
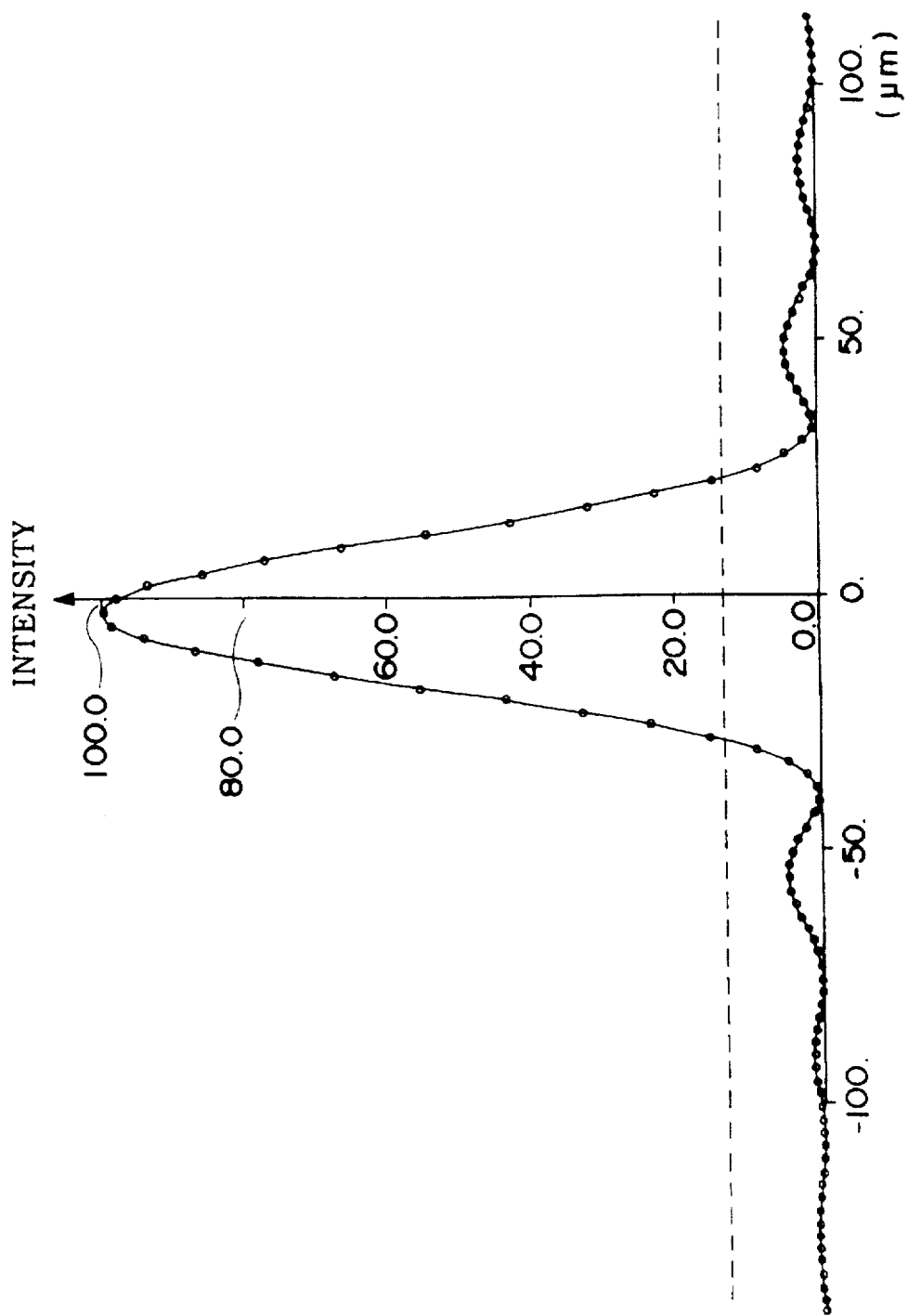
FIG. 7 shows a laser beam profile of a main scanning direction at a scan end on a surface to be scanned in the optical scanner of the second embodiment.

In the optical scanner of the second embodiment having the above-described structure, the beam profile at the scan end on the surface to be scanned is formed as that shown in FIG. 7. FIG. 6 shows a beam profile at a scan end of the surface to be scanned in the optical scanner having the conventional collimator lens.

As clearly seen from comparison between the beam profiles shown in FIG. 6 and FIG. 7, according to the optical scanner of the second embodiment, the side lobes are considerably reduced. Further, in an image exposure apparatus equipped with the above-described optical scanner 10, high-speed and high-resolution exposure processing can be achieved without causing deterioration in the image quality of an image to be exposed.

[Third Embodiment]

Next, a third embodiment of the present invention will be described. The third embodiment corresponds to the seventh aspect of the present invention and shows, as shown in FIG. 8, an example in which the present invention is applied to an optical scanner 70T constructed such that light beams are made incident on a rotating polygon mirror 78T further from an exterior side than the deflection angle of the rotating polygon mirror 78.

Figure 8:
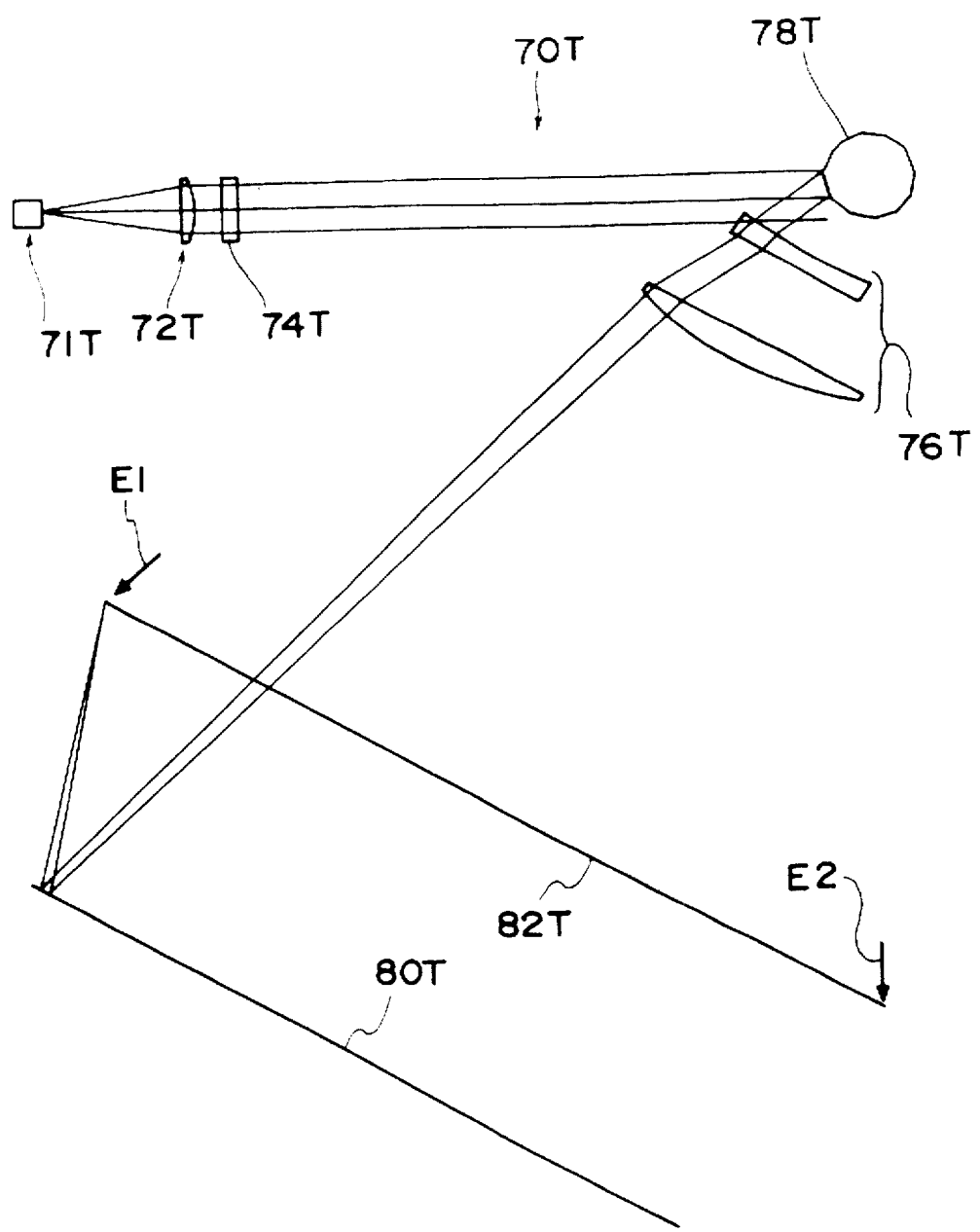
FIG. 8 is a plan view showing a structure of an optical scanner according to a third embodiment of the present invention.
Figure 19:
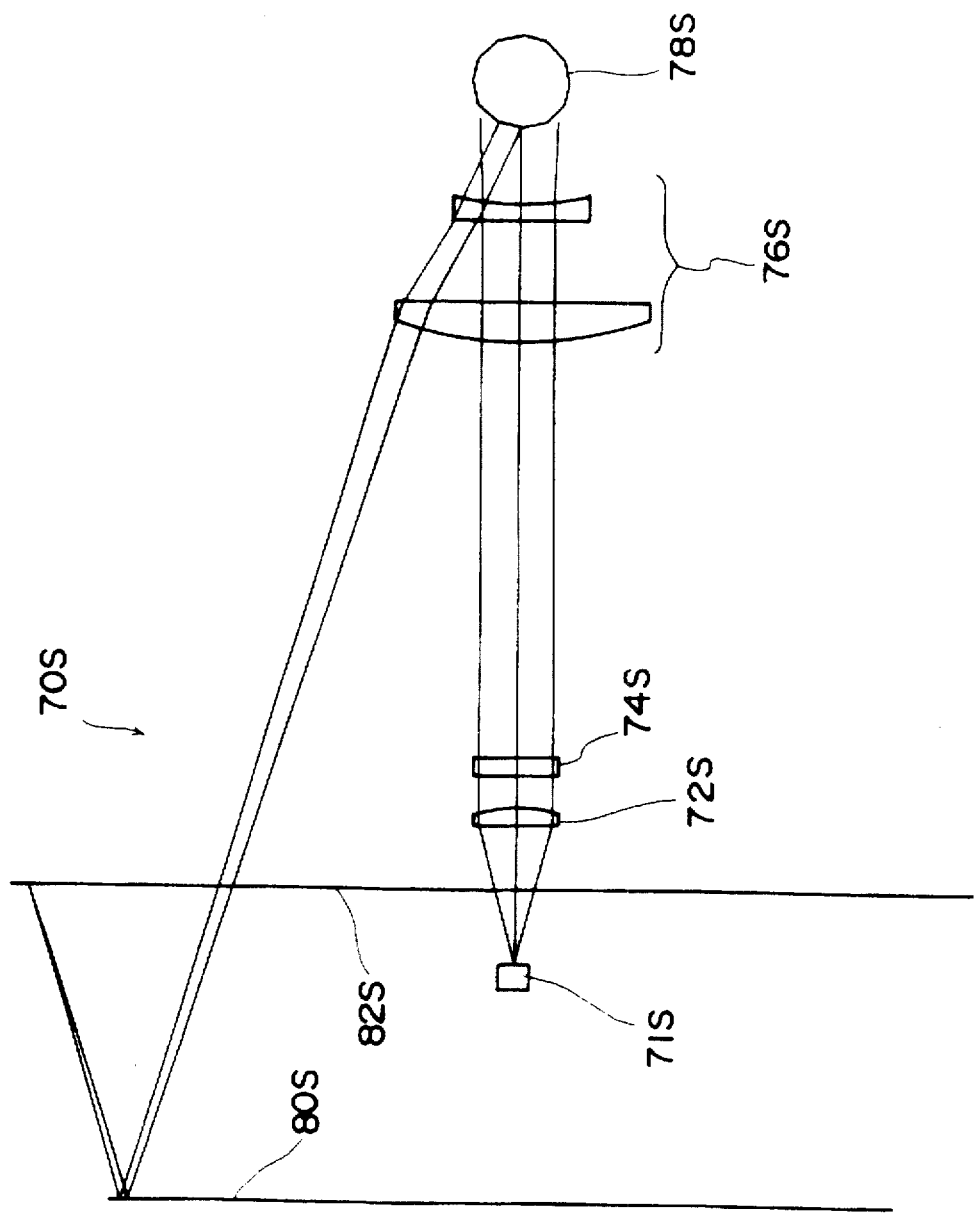
FIG. 19 shows a structural example of an overfilled optical system according to the conventional art and the first embodiment.

The structure of the optical scanner 70T shown in FIG. 8 is different from that of the optical scanner 70S of the first embodiment shown in FIG. 19 in the respect that light beams are made incident on the rotating polygon mirror 78T further from an exterior side than the deflection angle of the rotating polygon mirror 78T and also in the following respects:

The optical scanner 70T is different from the optical scanner 70S of the first embodiment as described below/
 Width of light beams incident on the rotating polygon mirror: 16 mm
 Intensity distribution of light beams with respect to the above-described light beam width: Gaussian distribution of which half width is 0.64705 times the width of light beams
 Surface width of the rotating polygon mirror: 8.66 mm
 Angle of incidence on the rotating polygon mirror: 60° with respect to the fθ lens optical axis.

Figure 9:
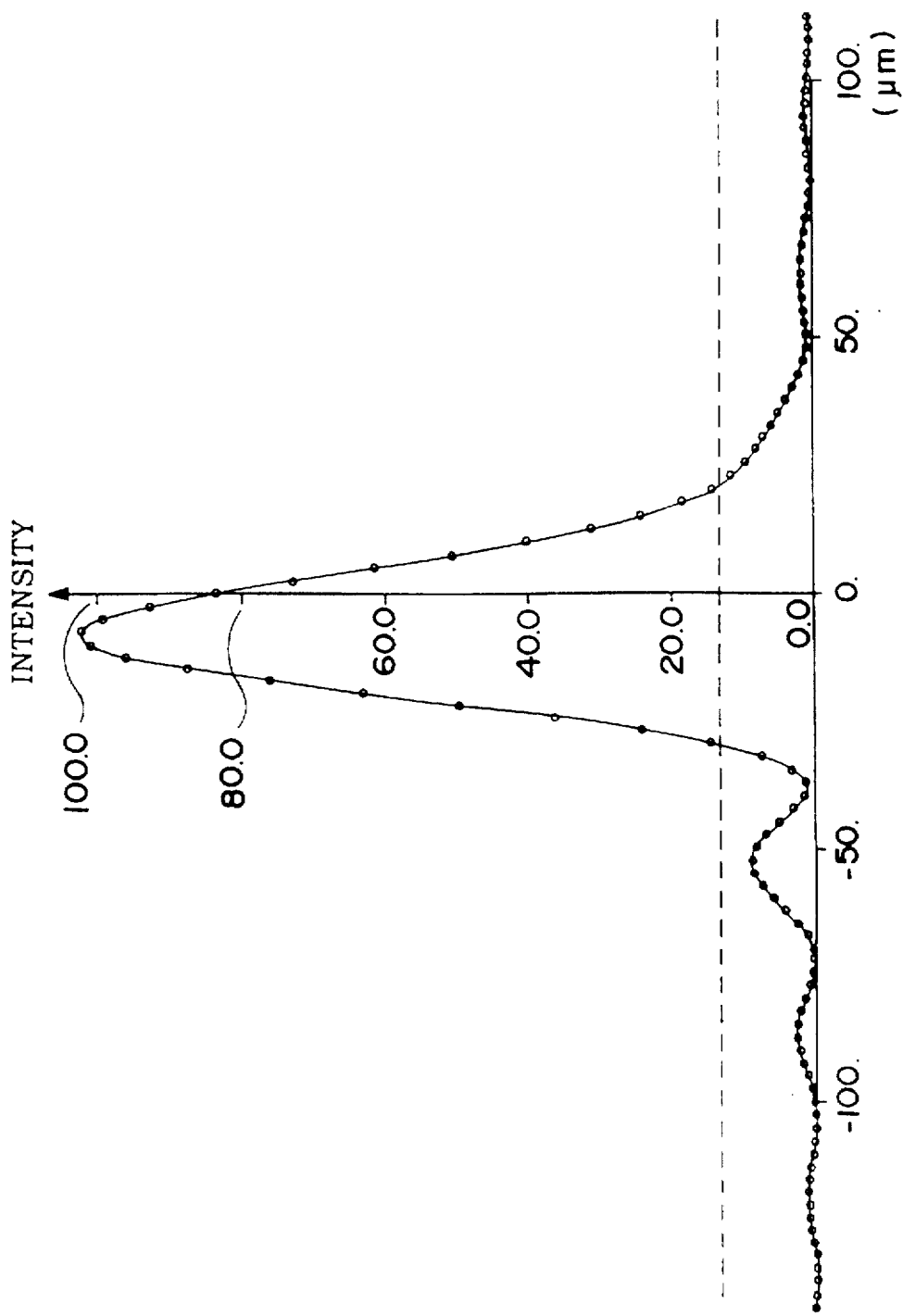
FIG. 9 shows a laser beam profile of a main scanning direction at a scan end at a side where a laser beam is made incident on a surface to be scanned when a conventional collimator lens is applied to the optical scanner according to the third embodiment.
Figure 10:
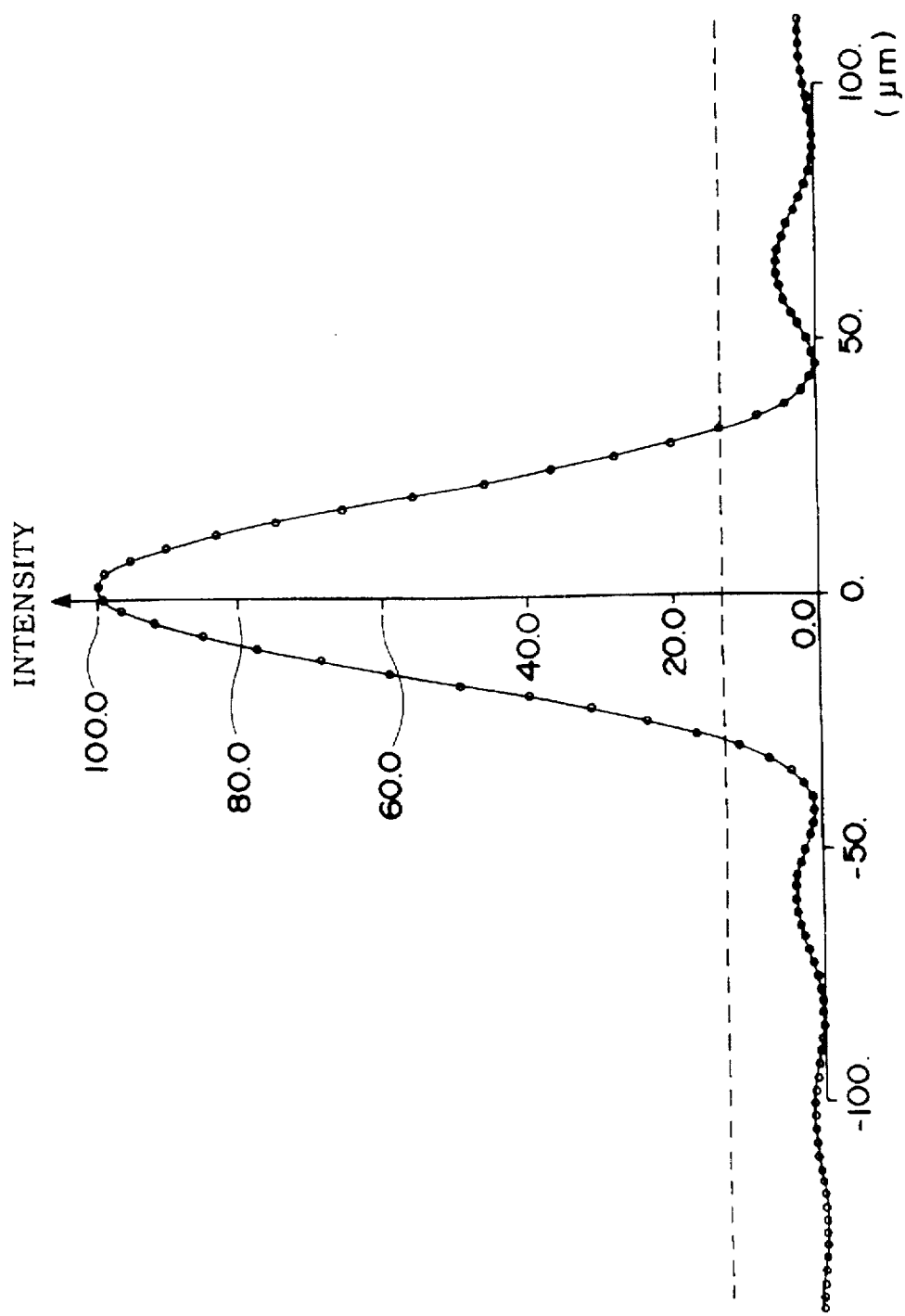
FIG. 10 shows a laser beam profile of a main scanning direction at a scan end at a side opposite to the side where a laser beam is made incident on a surface to be scanned when the conventional collimator lens is applied to the optical scanner according to the third embodiment.

When the shape of the collimator lens used in this embodiment is the same as that of the collimator lens shown in the first embodiment, the beam profile on the surface to be scanned is shown in FIGS. 9 and 10. Meanwhile, FIG. 9 shows a beam profile at one scan end at the side where the beam is made incident on the rotating polygon mirror (indicated by arrow E1) and FIG. 10 shows a beam profile at an opposite scan end at the side where the beam is made incident on the rotating polygon mirror (indicated by arrow E2). As clearly seen from FIG. 9, the beam profile at the side where light beams are incident is greatly deformed.

Accordingly, the shape of the collimator lens in the third embodiment is changed as described below.

k=−0.282272
A=0.149855e$^{-5}$
B=0.108990e$^{-7}$
C=−0.144436e$^{-9}$
D=0.676408e$^{-12}$

Figure 11:
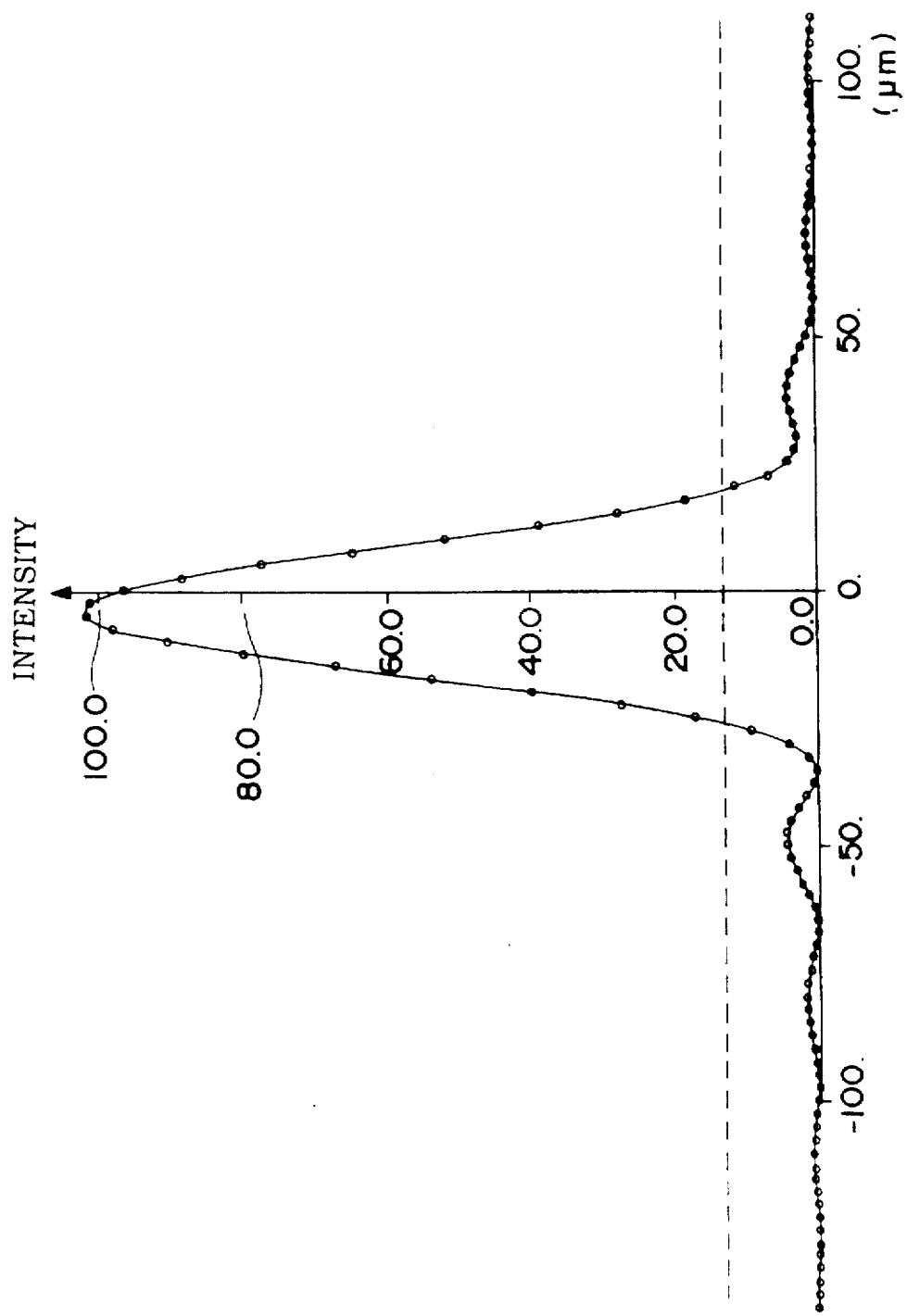
FIG. 11 shows a laser beam profile of a main scanning direction at a scan end on a side where a laser beam is made incident on the surface to be scanned in the optical scanner of the third embodiment.
Figure 12:
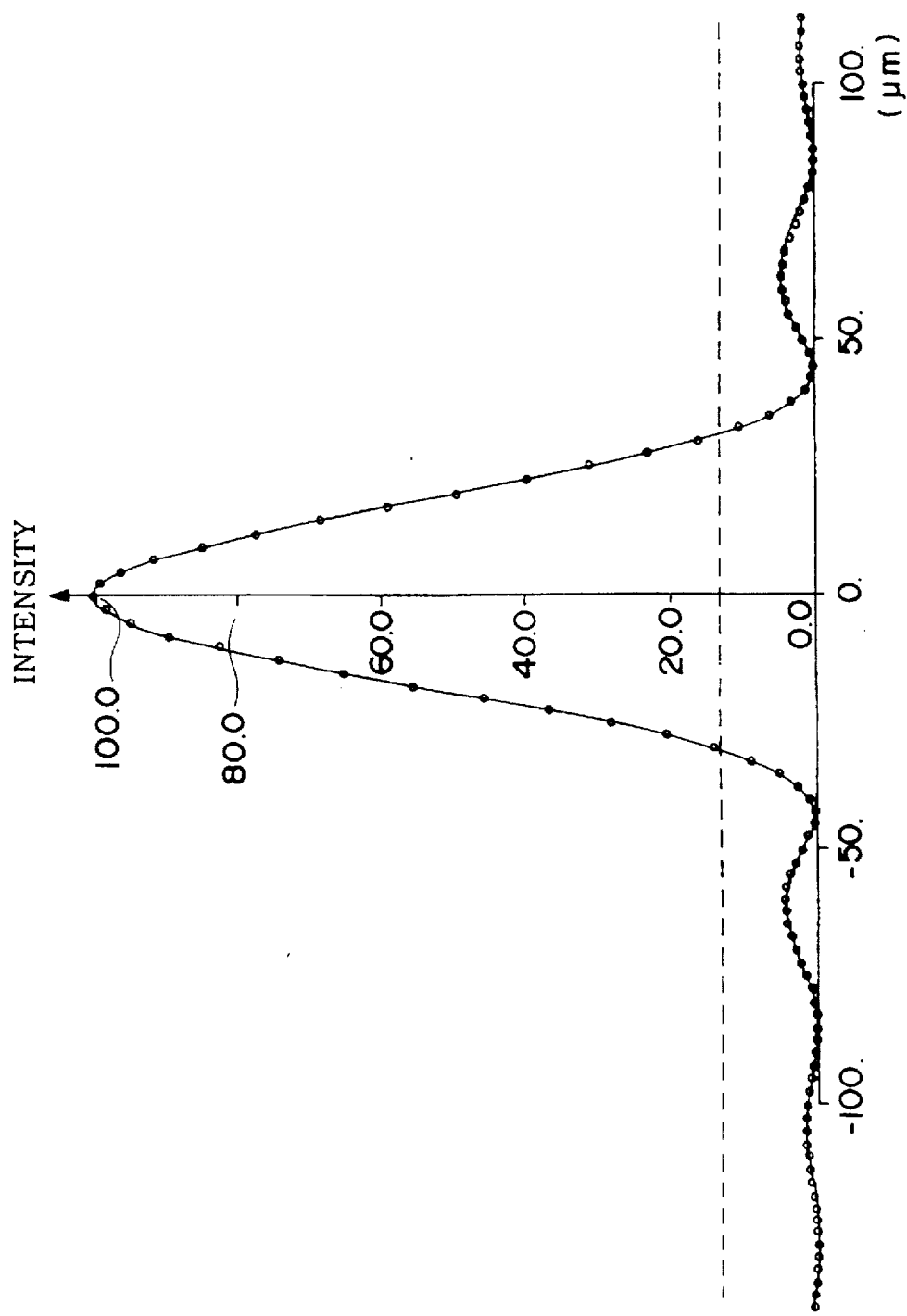
FIG. 12 shows a laser beam profile of a main scanning direction at a scan end on a side opposite to the side where a laser beam is made incident on the surface to be scanned in the optical scanner of the third embodiment.
Figure 13:
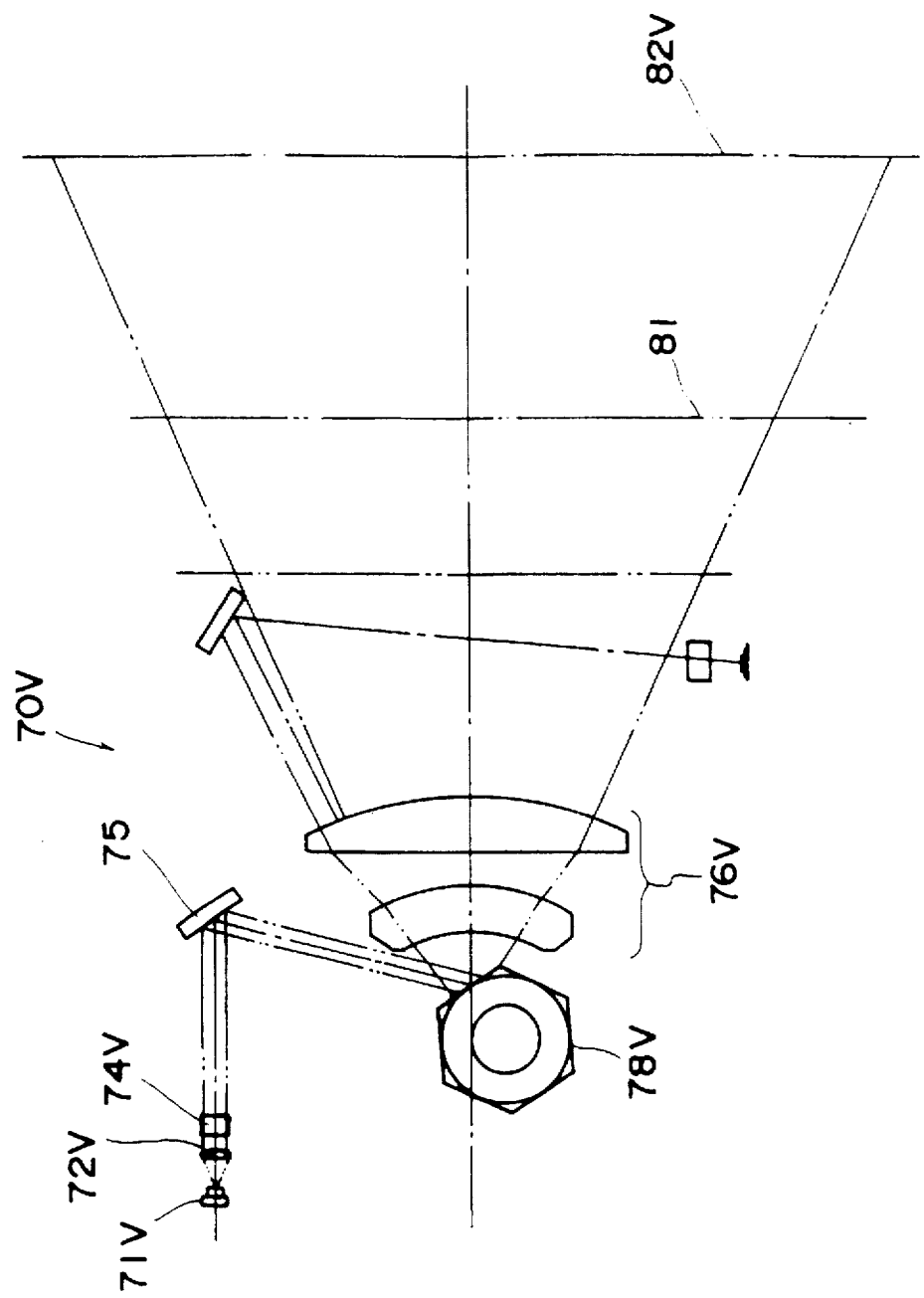
FIG. 13 is a plan view showing a structural example of a conventional optical scanner.
Figure 14:
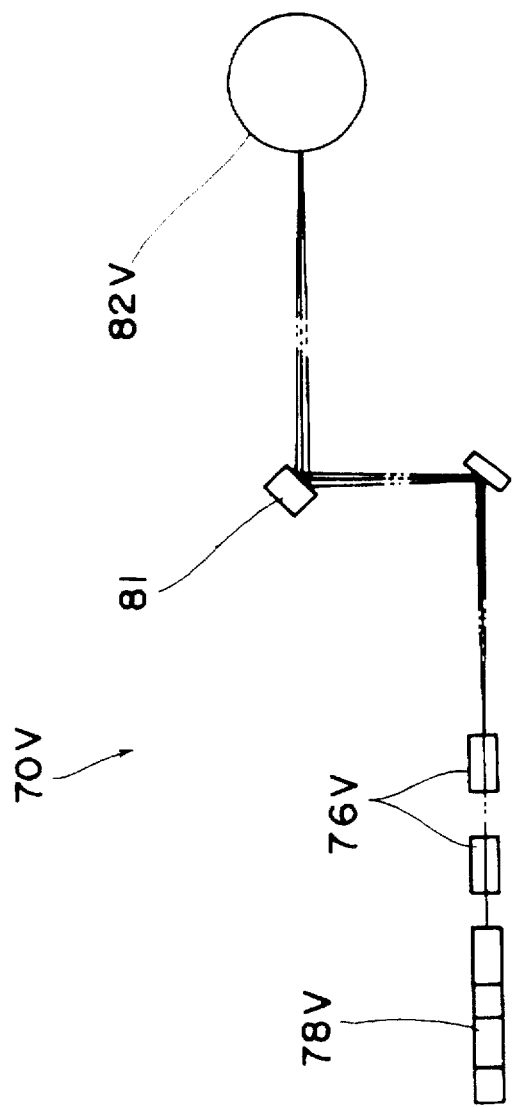
FIG. 14 is a side view showing the structural example of the conventional optical scanner.
Figure 15:
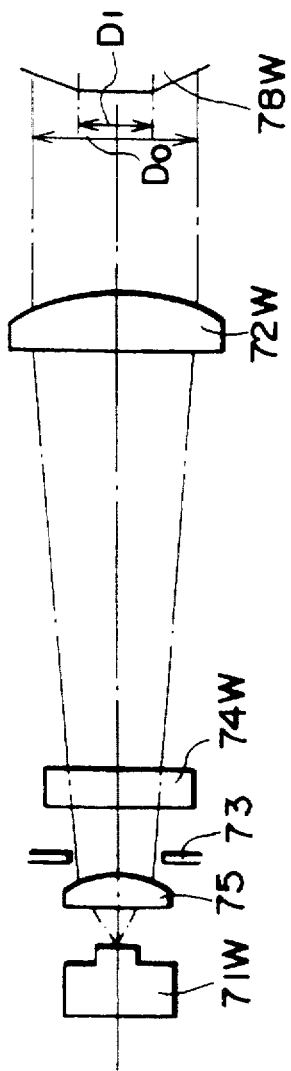
FIG. 15 shows a part of an optical system in another structural example of a conventional optical scanner.
Figure 16:
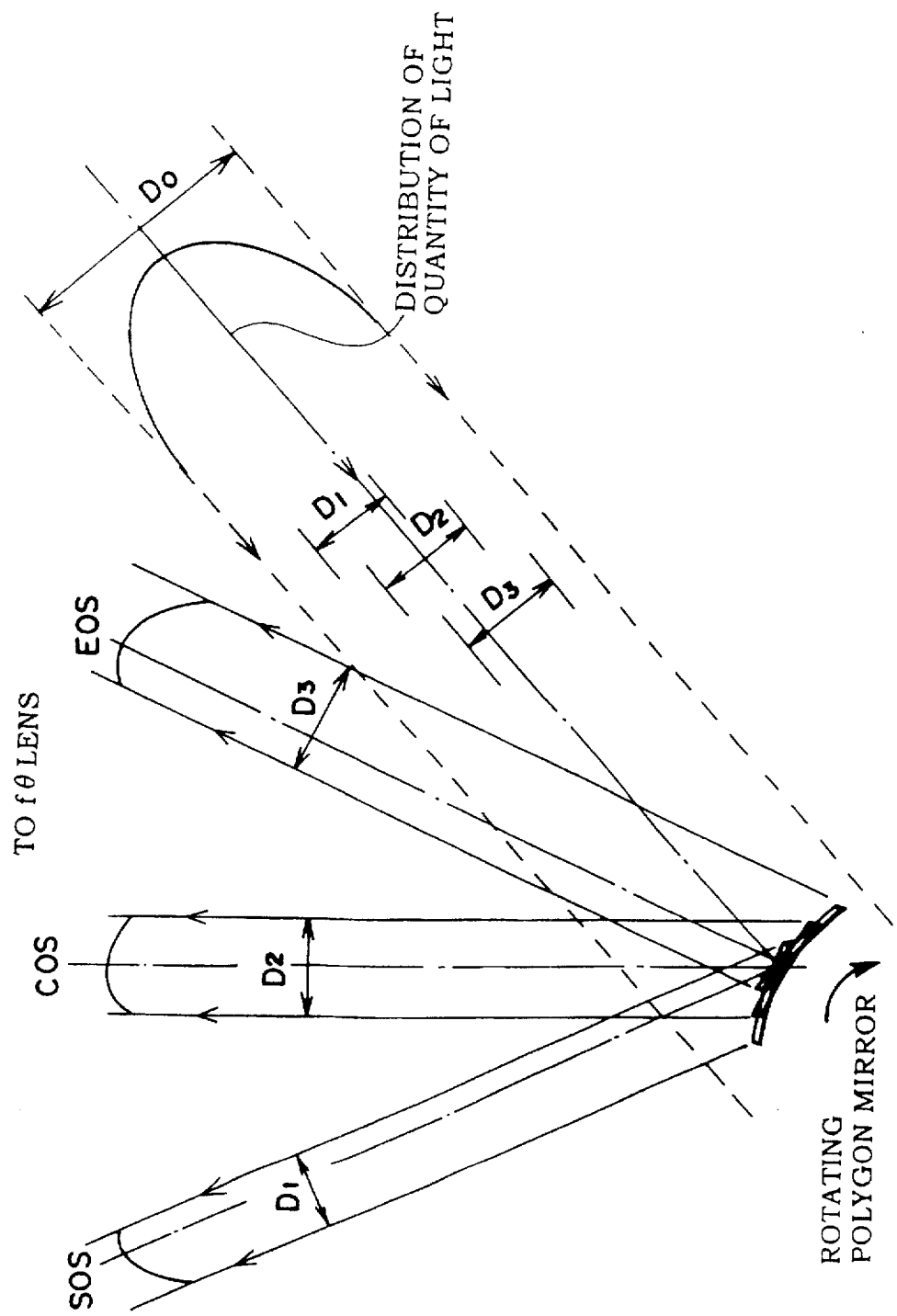
FIG. 16 shows that respective widths, in a main scanning direction, of light beams deflected by a rotating polygon mirror at various positions in a range from a scan starting position to a scan ending position via a scan central position.
Figure 17:
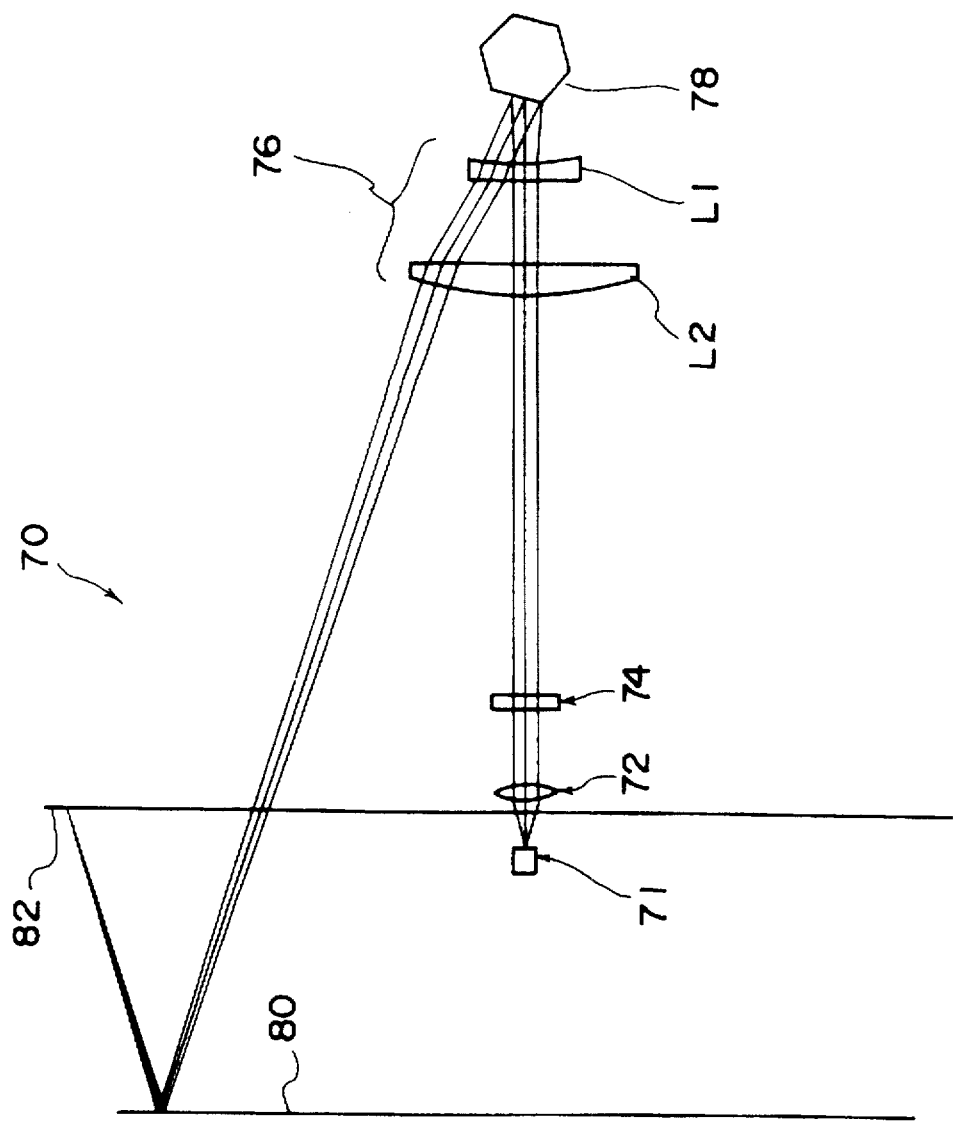
FIG. 17 shows a structural example of a conventional underfilled optical system.
Figure 18:
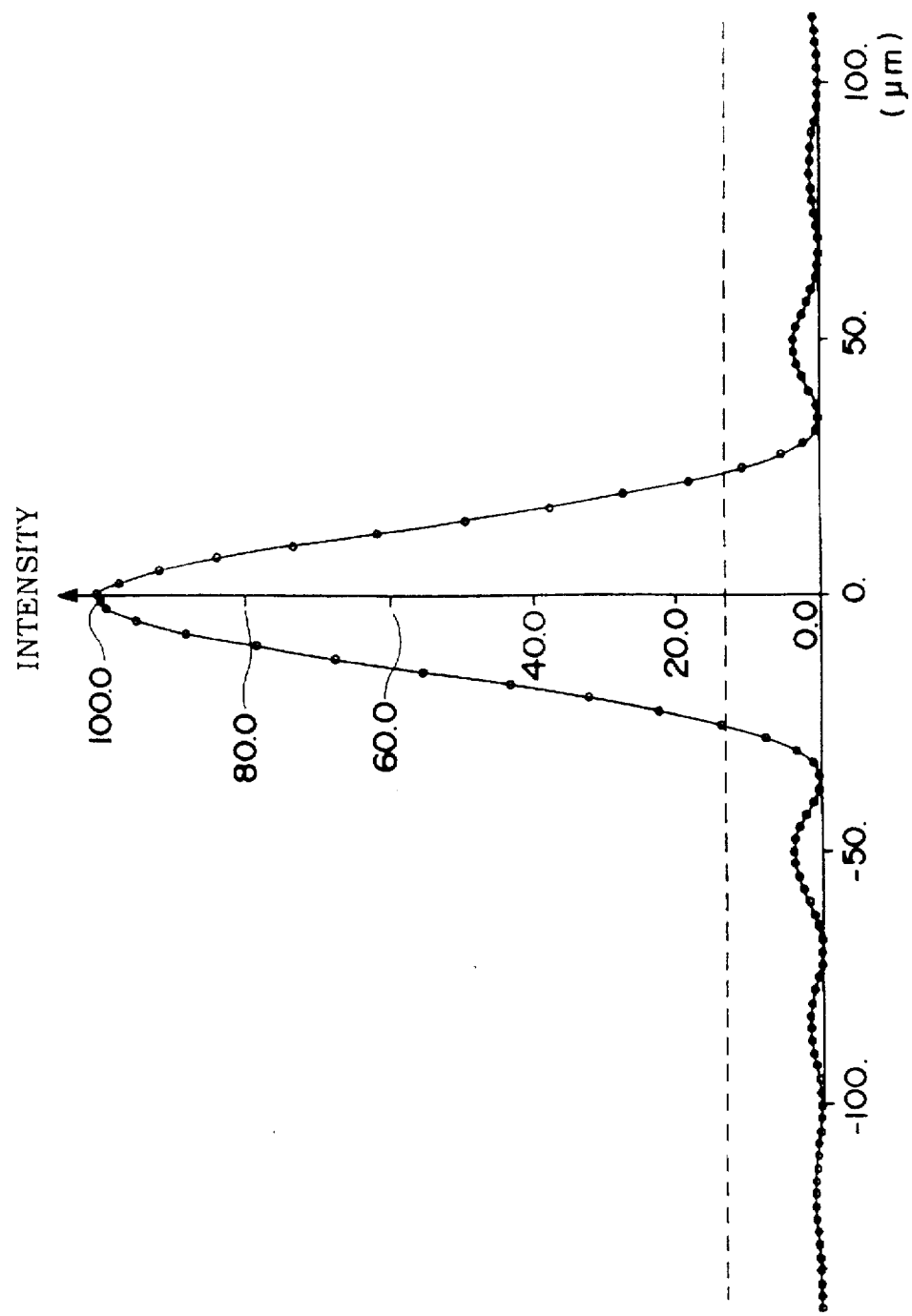
FIG. 18 shows a laser beam profile of a main scanning direction at a scan end on a surface to be scanned with the underfilled optical system shown in FIG. 17 being used.

As a result, the beam profile on the surface to be scanned is formed as that shown in FIGS. 11 and 12. FIG. 11 shows the beam profile at one scan end (indicated by arrow E1 in FIG. 8) at the side where the light beams are incident on the rotating polygon mirror and FIG. 12 shows the beam profile at an opposite scan end (indicated by arrow E2 in FIG. 8). Due to comparisons between FIG. 11 and FIG. 9 and between FIG. 12 and FIG. 10, it can be seen that the side lobes are reduced. Particularly, as clearly seen from the comparison between FIG. 11 and FIG. 9, side-lobe reduction effects are great at the scan end at the side where the light beams are made incident.

In the above-described first and second embodiments, the aspherical shape of the collimator lens is rotationally-symmetrical about the center of the optical axis. However, when light beams are made incident from the side of the rotating polygon mirror as shown in the third embodiment, deformation of the beam profile is not made symmetrical at both scan ends. For this reason, depending on the structure of the optical system, there may be cases in which the beam profile cannot be sufficiently improved when the rotationally-symmetrical and aspherical surface is used. In this case, it suffices that the shape of an asymmetrical aspherical surface may be applied to the above-described lens without being limited to the rotationally-symmetrical and aspherical surface.

As described above, the present invention can achieve the effect in that in the overfilled optical system having a simple structure, deformation (side lobes and the like) of the beam profile of light beams convergent on the surface to be scanned can be reduced.

What is claimed is:

1. An optical scanner in which light beams from a light source are made incident in such a manner as to extend over a plurality of reflecting surfaces of a rotating polygon mirror, comprising:

a light source;

a first optical system which causes at least divergent light beams of a main scanning direction from said light source to be made into substantially parallel light beams;

a rotating polygon mirror which deflects the substantially parallel light beams emitted from said first optical system along a predetermined main scanning direction by the plurality of reflecting surfaces; and a second optical system which causes the light beams deflected by said rotating polygon mirror to be scanned on a surface to be scanned substantially at a uniform velocity and to be converged on the surface to be scanned, wherein the substantially parallel light beams emitted from said first optical system is provided to form a wave surface for correcting an aberration in said second optical system.

2. An optical scanner according to claim 1, wherein said first optical system is provided such that the shape of a wave surface in an outside portion of the emitted light beams allows correction of an aberration from the plane or the spherical surface.

3. An optical scanner according to claim 2, wherein said first optical system includes at least one aspherical optical component.

4. An optical scanner according to claim 3, wherein the aspherical optical component is formed by one aspherical lens.

5. An optical scanner according to claim 3, wherein said first optical system is formed by a plurality of lenses and at least one of the plurality of lenses is an aspherical lens.

6. An optical scanner according to claim 1, wherein said first optical system is formed to correct deformation of intensity distribution of the light beams converged on the surface to be scanned, which the deformation being provided to become larger as the light beams are moved from a scan central portion to a scan end portion in the main scanning direction.

7. An optical scanner according to claim 6, wherein said first optical system includes at least one aspherical optical component.

8. An optical scanner according to claim 7, wherein the aspherical optical component is formed by one aspherical lens.

9. An optical scanner according to claim 7, wherein said first optical system is formed by a plurality of lenses and at least one of the plurality of lenses is an aspherical lens.

10. An optical scanner according to claim 1, wherein said first optical system includes at least one aspherical optical component.

11. An optical scanner according to claim 10, wherein the aspherical optical component is formed by one aspherical lens.

12. An optical scanner according to claim 11, wherein said first optical system is formed by a front incidence optical system in which light beams from said light source are made incident on said rotating polygon mirror substantially from the center of a deflection angle of said rotating polygon mirror.

13. An optical scanner according to claim 12, wherein said first optical system is formed so that light beams from said light surface are made incident on said rotating polygon mirror from a direction provided at an angle with respect to a direction orthogonal to the axis of rotation within a plane on which an optical axis of the light beams and the axis of rotation of said rotating polygon mirror are included.

14. An optical scanner according to claim 11, wherein said first optical system is formed so that light beams from said light source are made incident on said rotating polygon mirror further from an exterior side than a maximum deflection angle of said rotating polygon mirror.

15. An optical scanner according to claim 14, wherein a cross-sectional configuration of the aspherical optical component along the main scanning direction is asymmetrical about the optical axis.

16. An optical scanner according to claim 10, wherein said first optical system is formed by a plurality of lenses and at least one of the plurality of lenses is an aspherical lens.

17. An optical scanner according to claim 16, wherein said first optical system is formed by a front incidence optical system in which light beams from said light source are made incident on said rotating polygon mirror substantially from the center of a deflection angle of said rotating polygon mirror.

18. An optical scanner according to claim 17, wherein said first optical system is formed so that light beams from said light surface are made incident on said rotating polygon mirror from a direction provided at an angle with respect to a direction orthogonal to the axis of rotation within a plane on which an optical axis of the light beams and the axis of rotation of said rotating polygon mirror are included.

19. An optical scanner according to claim 16, wherein said first optical system is formed so that light beams from said light source are made incident on said rotating polygon mirror further from an exterior side than a maximum deflection angle of said rotating polygon mirror.

20. An optical scanner according to claim 19, wherein a cross-sectional configuration of the aspherical optical component along the main scanning direction is asymmetrical about the optical axis.

21. An optical scanner according to claim 10, wherein said first optical system is formed by a front incidence optical system in which light beams from said light source are made incident on said rotating polygon mirror substantially from the center of a deflection angle of said rotating polygon mirror.

22. An optical scanner according to claim 21, wherein said first optical system is formed so that light beams from said light surface are made incident on said rotating polygon mirror from a direction provided at an angle with respect to a direction orthogonal to the axis of rotation within a plane on which an optical axis of the light beams and the axis of rotation of said rotating polygon mirror are included.

23. An optical scanner according to claim 22, wherein said first optical system is formed by a double-path optical system in which light beams from said light source are transmitted through an identical optical component included in said first optical system before light beams are made incident on said rotating polygon mirror and after light beams are deflected by said rotating polygon mirror.

24. An optical scanner according to claim 22, wherein an aspherical shape of the aspherical optical component is symmetrical about the optical axis in the main scanning direction.

25. An optical scanner according to claim 24, wherein an aspherical shape of the aspherical optical component is rotationally symmetrical about the optical axis.

26. An optical scanner according to claim 21, wherein said first optical system is formed by a double-path optical system in which light beams from said light source are transmitted through an identical optical component included in said first optical system before light beams are made incident on said rotating polygon mirror and after light beams are deflected by said rotating polygon mirror.

27. An optical scanner according to claim 26, wherein an aspherical shape of the aspherical optical component is symmetrical about the optical axis in the main scanning direction.

28. An optical scanner according to claim 27, wherein an aspherical shape of the aspherical optical component is rotationally symmetrical about the optical axis.

29. An optical scanner according to claim 21, wherein an aspherical shape of the aspherical optical component is symmetrical about the optical axis in the main scanning direction.

30. An optical scanner according to claim 29, wherein an aspherical shape of the aspherical optical component is rotationally symmetrical about the optical axis.

31. An optical scanner according to claim 10, wherein said first optical system is formed so that light beams from said light source are made incident on said rotating polygon mirror further from an exterior side than a maximum deflection angle of said rotating polygon mirror.

32. An optical scanner according to claim 31, wherein a cross-sectional configuration of the aspherical optical component along the main scanning direction is asymmetrical about the optical axis.

* * * * *